US008157872B2

(12) United States Patent  (10) Patent No.: US 8,157,872 B2
Becvar et al.  (45) Date of Patent: *Apr. 17, 2012

(54) SYSTEM AND METHOD FOR CREATING INK ART

(76) Inventors: James E. Becvar, El Paso, TX (US); Amaya Becvar Weddle, San Jose, CA (US)

(\*) Notice: Subject to any disclaimer, the term of this patent is extended or adjusted under 35 U.S.C. 154(b) by 200 days.

This patent is subject to a terminal disclaimer.

(21) Appl. No.: 12/430,031

(22) Filed: Apr. 24, 2009

(65) Prior Publication Data
US 2010/0024970 A1  Feb. 4, 2010

Related U.S. Application Data

(63) Continuation-in-part of application No. 11/868,368, filed on Oct. 5, 2007, now Pat. No. 8,057,552.

(60) Provisional application No. 60/828,546, filed on Oct. 6, 2006.

(51) Int. Cl.
  *C08F 263/00* (2006.01)
(52) U.S. Cl. ............ 8/115.53; 8/115.51; 8/115.54; 8/444; 106/31.13; 106/31.15; 106/31.32; 106/31.64; 156/242; 206/575; 222/187
(58) Field of Classification Search ......... 8/636, 115.51, 8/115.53, 115.54, 444; 106/30.02, 31.13, 106/31.15, 31.32, 31.64; 428/332; 156/242; 206/575; 222/187
See application file for complete search history.

(56) References Cited

U.S. PATENT DOCUMENTS

| 670,396 | A | 4/1901 | Collin |
| 1,623,709 | A | 4/1927 | Smith |
| 2,296,379 | A | 9/1942 | Croft |
| 4,477,511 | A | 10/1984 | Hanig |
| 5,389,426 | A | 2/1995 | Arens et al. |
| 5,554,198 | A | 9/1996 | Poplin |
| 5,756,166 | A | 5/1998 | Shinohara |

(Continued)

FOREIGN PATENT DOCUMENTS
JP  2000-037997  2/2000

*Primary Examiner* — Khanh Tuan Nguyen
(74) *Attorney, Agent, or Firm* — Janeen Vilven; Peacock Myers, P.C.

(57) ABSTRACT

A system, method and apparatus is disclosed for coloring a substantially wicking substrate comprising applying to a substantially wicking substrate an ink comprising a first dye and a second dye to define a region of reference; applying a first solvent to the substantially wicking substrate to move the first dye and the second dye within the body of the substantially wicking substrate; moving the two dyes in a defined direction to carry the two dyes outside of the defined region to color an area of the wicking substrate; coloring at least a portion of the substantially wicking substrate by allowing the first solvent to move through a portion of the first dye for a first distance from the defined point of origin of the ink and the second dye a second distance from the defined point of origin of the ink wherein the first distance is sufficiently different from the second distance to recognize a separation between the first dye and the second dye thereby coloring the substantially wicking substrate outside of the defined region on the front surface; shaping a portion of the colored wicking substrate into a form; assembling one or more such colored forms with a support into an assemblage; and affixing the form onto a support for display.

28 Claims, 10 Drawing Sheets
(1 of 10 Drawing Sheet(s) Filed in Color)

U.S. PATENT DOCUMENTS

| | | |
|---|---|---|
| 6,454,842 B1 * | 9/2002 | Vernardakis et al. ...... 106/31.02 |
| 6,586,045 B1 | 7/2003 | Cole |
| 7,629,400 B2 | 12/2009 | Hyman |
| 2003/0035917 A1 | 2/2003 | Hyman |
| 2004/0108078 A1 | 6/2004 | Chen et al. |
| 2005/0022313 A1 | 2/2005 | Scheidler |
| 2005/0048279 A1 * | 3/2005 | Watson et al. ................ 428/332 |
| 2006/0114754 A1 | 6/2006 | MacDonald et al. |
| 2008/0092308 A1 | 4/2008 | Becvar et al. |

* cited by examiner

A

B

SYSTEM AND METHOD FOR CREATING INK ART

CROSS-REFERENCE TO RELATED APPLICATIONS

This application is a continuation-in-part application of U.S. patent application Ser. No. 11/868,368, entitled "A System and Method for Creating Ink Art", to James E. Becvar et al., filed on Oct. 5, 2007 now U.S. Pat. No. 8,057,552 which claims priority to and the benefit of U.S. Provisional Patent Application Ser. No. 60/828,546, entitled "A System and Method for Creating Ink Art", to James E. Becvar et al., filed on Oct. 6, 2006, and the specification and claims thereof are all incorporated herein by reference.

BACKGROUND

The present invention relates generally to the field of methods for coloring a substrate by a process to create a water color or tie-dye effect on the substrate and combining these initial steps with a combination of further steps for subsequent use in a greeting card or other useful product.

A colorant, or the substance used to give color to an ink, is either dye, pigmentation, or other color-causing ingredient. The colorant, consisting of molecules or small particles, blends with a carrier-based solution or suspension. A carrier-dye based ink tints or stains the substrate on a molecular level and gives color to the substrate by virtue of differential absorption or reflection of some region or regions of the visible electromagnetic radiation spectrum of light.

The initial process and steps in the present invention resemble and include the process of chromatography, which is an analytical process for separating mixtures containing substances (which may or may not be colored) on the surface of a separation phase medium or through such a medium. In the chromatographic process, the substances in a mixture move substantial distances through the medium by intentional displacement of a mobile phase (solvent) in a defined direction through the medium (stationary phase) which separates one molecular substance from other molecules in the mixture. The aforementioned 'substantial distances' for the separation process in chromatography are often easily visible to the naked eye and often many centimeters if the chromatography takes place within the matrix (and is visible on the surface) of a common substance like chromatography paper or a thin layer chromatogram.

Chromatography exploits the differences in partitioning behavior between a mobile phase (solvent) and a stationary phase to separate the components in a mixture. Components of a mixture may be chemically or physically interacting with the mobile and stationary phases and separation is based on properties such as charge, molecular size, molecular polarity, hydrogen bonding, relative solubility or adsorption.

Watercolor art often requires repeated very careful sequential applications of wet colorant to substrate interspersed with time periods of drying. The watercolor colorant is usually carefully applied to a position using a brush. Effort is taken to apply the colorant to regions on the substrate defined by the user and to prevent the color from running. Children and people with handicaps have a difficult time using a brush in this fashion and keeping the colors from bleeding and being applied to unwanted regions.

It should be appreciated that this invention, methods, and processes would work equally well with 'dyes' and 'inks' that are not initially visible to the eye, e.g. 'invisible inks', that are revealed only after a secondary treatment such as short wave ultraviolet irradiation, heating, or chemical treatment, or a combination thereof, in which a chemical or photochemical process takes place to produce the colored regions of the substantially wicking substrate.

SUMMARY OF THE INVENTION

The present invention provides a method for applying colored ink to a substantially wicking or porous substrate and separating or partially separating one or more colorants in the ink to create dye patterns thereon to produce a colored substrate with different colors and different patterns in different regions. With this system and method one can make effortless ethereal expressions in a solvent-entrapping enclosure in a short period of time. This colored wicking substrate in possible combination with other colored wicking substrates is then used in further steps of shaping, assembling, combining, positioning, reorienting, scenting, and affixing onto a support for a user-defined purpose.

One embodiment of the present invention provides a method for coloring a substantially wicking substrate as the initial steps of the invention. Further steps of the invention include shaping one or more portions of the substantially wicking substrate in possible combination with another portion or portions of one or more colored wicking substrates into a form, assembling the colored form or forms into an assemblage with a support, and affixing the form or forms onto the support. The coloring steps comprise applying to a substantially wicking substrate an ink comprising a first dye and a second dye to define a region of reference on the front surface of the wicking substrate. A first solvent is applied to the substantially wicking substrate to cause the first dye and the second dye to move in a defined direction within the body of the substantially wicking substrate over distances representing substantial distances and substantial fractions of the distance of one of the long dimensions of the surface area of the substantially wicking substrate. This solvent migration moves the first and second dyes on the surface of the substantially wicking substrate so as to carry the dyes to color the surface outside of the defined region. The first solvent moves through a portion of the first dye for a first distance from the defined region and the second dye a second distance from the defined region wherein the first distance moved on the surface is sufficiently different from the second distance to recognize a separation between the first dye and the second dye thereby coloring the substantially wicking substrate outside of the defined region on the front surface. The first dye and the second dye move over the surface of the substantially wicking substrate to color a surface area of the substantially wicking substrate that is considerably greater than the surface area of the substantially wicking substrate to which the ink was originally applied. A considerable portion of the substantially wicking substrate is colored. This thusly-colored substantially wicking substrate is used in combination with possible other colored wicking substrates. Optionally, further steps of shaping, reorienting, scenting, organizing, or assembling and possibly reshaping into a user-defined assemblage and affixing the assemblage onto a support can be applied.

The comparative terms "substantial distances and substantial fractions of the distance of", "sufficiently different from", "considerably greater than the surface area of" and "considerable portion of" used with reference to the substantially wicking substrate and the coloration process in the preceding paragraph are used in reference to the long dimensions of the total surface area of the substantially wicking substrate without regard to the shape of this surface area (e.g. square, rectangular, round, or some other shape). A sheet of chromatography paper does not need to be, but can be as large or larger in area than a sheet of ordinary writing paper of X×Y dimensions approximately 8½×11 inches (216 mm×280 mm) in the United States. The third and shortest, Z, dimension of a sheet of chromatography paper can be estimated from the fact that a stack of 100 sheets of chromatography paper sold by Fisher Scientific Company (Catalog Number 05-714-1) is about 21 mm in thickness. Thus the thickness of a single sheet of this chromatography paper would be $^{21}/_{100}$ mm or about 0.21 mm; this thickness dimension of the substantially wicking substrate is $^{1}/_{1000}$ the dimension of the shorter of the two other dimensions of the surface of a sheet of writing paper. The long dimension(s) of substantially wicking substrates are often greater than the thickness dimension by a factor of 100. Thus the term "substantial distance of one of the long dimensions of" a sheet of chromatography paper in reference to the distance of migration that a colorant moves could reasonably be equated with a distance between about 2% to about 98% of the X or Y dimension of the substantially wicking substrate. For example, if the sheet of chromatography paper being used had X×Y dimensions of 200×200 mm, 2% of X or Y would be about 4 mm and 98% of X or Y would be about 196 mm. Further, if the initial application zone of ink had dimensions of about 2 mm×180 mm on this 200 mm×200 mm sheet of paper, coloring a surface area of the substantially wicking substrate that is considerably greater than the surface area of the substantially wicking substrate to which the ink was originally applied would reasonably refer to an area considerably larger than the 360 mm$^2$ area of the initially inked 2 mm×180 mm region, e.g. perhaps 400 mm$^2$ or much larger.

During the color development and separation steps of the invention, the solvent may move through a distance greater than half of the long dimension of the substantially wicking substrate, often this distance will be almost the entirety of the long dimension of the wicking substrate. In reference to the aforementioned 200×200 mm sheet of chromatography paper, the solvent would thus move a substantial fraction of 200 mm, perhaps as much as 190 mm or more. The dyes move by solvent induced action through the fibers and material of the substantially wicking substrate to produce a separation distance between the dyes of from approximately 2% to approximately 99% of the distance through which the solvent moves. Because the dyes both move, so as to recognize a separation, the regions colored can occupy a considerable portion of, and possibly almost the entire surface area of, the substantially wicking substrate, such that the distances of separation between dye regions may be a millimeter to many centimeters.

A scientist or another person skilled in the art of chromatography often prefers that the front edge of the solvent moving through the separation matrix do so in a very uniform fashion so that the molecules of solvent move at essentially the same rate of travel everywhere within the matrix at the same time, i.e. such that the solvent front on a two dimensional sheet of paper or thin layer chromatogram appears to be a straight line moving at essentially a constant rate. In actual fact, every separation matrix has a third dimension and the solvent front would actually be a plane having two dimensions. A scientist or another person skilled in the art of chromatography often designs and takes great care to make this plane and this solvent front be as flat, straight, and un-curved as possible and often would consider any curvature (e.g. caused by different rates of travel of the solvent molecules at different positions in the matrix and at the solvent front) to be undesirable. Non-uniform solvent migration and unequal rate of solvent molecule travel through the wicking substrate in the present invention produces non-linear patterns of color in the wicking substrate, specifically because the solvent molecules are not moving at a constant rate everywhere within the wicking substrate and at all times and the solvent front is not moving in a straight line or flat plane aspect. The user of the present invention may purposefully cause this to happen by adding solvent at different rates and in different amounts at the points where solvent is added to the system or apparatus used for causing ink and dye migration. These color patterns often have a wavy, blurry, streaked aspect and a non-uniform appearance in different regions of the wicking substrate. Dye regions and areas for a given dye are not seen to be found in straight-line and uniform fashion on the surface and show thinner and thicker regions, areas, and bands over the surface. Some regions of a given dye in the applied ink are less intense in color and other regions are more intense in color because the dye molecule density (number of dye molecules per unit surface area or unit volume of the wicking substrate) for the given dye is different at different places and regions within the wicking substrate. Waviness, non-uniformity and oval, blurry, or globular variation in color density are considered satisfactory and often a desirable aspect in the colored wicking substrate for purposes of the present invention. Wavy, blurry, globular, oval-shaped, steaks of thin and thick dye-separated coloration produced by uneven solvent migration rate produces the ethereal character to the final colored wicking substrate for use in the further steps of the invention.

One aspect of the present invention is that the solvent-induced dye coloration process can take place with the substantially wicking substrate held in place in many possible orientations with respect to the direction of gravity, for example in a horizontal or vertical aspect with respect to the direction of gravity or at any angle with respect to the direction of gravity. Furthermore, since waviness and non-uniformity often are considered to enhance the final colored product of this invention, the user may choose to take advantage of gravity by changing the relative angle of the X and Y dimensions of the substantially wicking substrate with respect to the direction of gravity during the solvent migration dye coloration process. Further, the substantially wicking substrate does not have to be held in a planar, flat orientation during solvent-induced coloration. The sheet of substantially wicking substrate can be curled into a cylinder or any other three-dimensional shape, folded, torn, made with holes, cut-outs or the like and held at any angle with respect to the direction of gravity to cause or enhance non-uniform color development. The axis of the cylinder or other three-dimensional shape can also be changed during solvent migration to alter or enhance the wavy, blurry, non-uniform character of coloration development in the colored substantially wicking substrate. The solvent induced coloration can be stopped in the middle of the coloration process and alteration or adulteration (including the addition of more dye or heating the substrate) can be made to the wicking substrate so as to influence the remainder of the coloration process.

In an alternative embodiment, a second solvent is applied to the substantially wicking substrate having the ink applied thereon. The second solvent proceeds through the point of origin in a different direction or same direction from the direction of the first solvent. The second solvent is the same or different from the first solvent. The second solvent may cause one or more dyes to migrate that were not caused to migrate by the first solvent.

In a preferred embodiment the support is selected from wood, plastic, paper, metal, glass, ceramic, bone, fish scale, animal hide, string, ribbon, plant materials, animate and inanimate objects like people, dogs, bicycles, notebooks, and other objects that only a child or someone young at heart can think of, illumination means, or a combination thereof. In a preferred embodiment, the solvent is selected from water, alcohols, aliphatic hydrocarbons, amides, amines, aromatic hydrocarbons, halogenated hydrocarbons, ethers, esters, acetates, ketones, citrus oils, glycols, and glycol ethers, acids, bases, aldehydes, soaps, detergents, surfactants and dimethyl sulfoxide or any combination thereof.

In a preferred embodiment, shaping is selected from folding, bending, tearing, cutting, burning, dividing, separating, twisting, curling, hammering, piercing, slicing, scraping, sanding, shredding and/or melting a shape from the wicking substrate previously colored, for example as above, by the user.

In a preferred embodiment, several shapes can be created from the same sheet of colored wicking substrate. These shapes may be symmetrical, asymmetrical or unsymmetrical shapes. Often the user will color several sheets of wicking substrate with different dyes and colors and create shapes from several sheets for use in the present invention.

In a preferred embodiment reorganizing, rotating, reorienting, reassembling, scenting, and reshaping one or more pieces from one or more colored substantially wicking substrates may provide a suitable assembled final product to be affixed as defined by a user. The process of reorganizing, reorienting, reshaping, or deforming the shapes may be deemed necessary by a user of the prevent invention. These processing steps may include rotating the colored shapes, turning them over from front to back, or in a different direction or at a different angle with respect to one another that they held during the coloration process(es). Further trimming of the shapes and further reorienting or deforming may be necessary to create a preferred design or assemblage. The preferred assemblage may consist of shapes with front sides and back sides of the colored wicking substrate facing in the same direction or in a different direction or at a different angle with respect to the direction and orientation that the pieces held during coloring. The colored wicking substrate may be bent, folded, curled, twisted, sliced, torn, shredded, beaten, hammered, pierced, scented, re-colored, written upon or otherwise deformed, altered, or adulterated from the flat or other aspect held during coloration in order for the user to define the final assemblage to be affixed onto a support.

In a more preferred embodiment, affixing comprises one or more selected from stapling, folding, gluing, pasting, adhering, cementing, taping, pinning, hooking, crimping, trapping, pressing, tying, inserting into a slit or pocket, or framing. The intent of affixing is to maintain at least one point of contact between at least one portion of the colored wicking substrate and at least one portion of the support. The affixing process is suitable to keep the colored surface and the support attached to one another should the user, for example, pick up, turn, or move the support in any direction.

In another embodiment of the present invention the method of applying solvent is via a solvent applicator held in relation to the substantially wicking substrate by an object-shaped applicator holder. The object-shaped solvent applicator holder is designed for holding a solvent applicator at a distance in relation to a substantially wicking substrate. The object-shaped solvent applicator holder optionally comprises a suspending member for suspending a solvent applicator above a substantially wicking substrate or for resting a solvent applicator on a substantially wicking substrate on a surface, such that a base of the solvent applicator holder rests upon the surface and keeps the solvent applicator in a substantially vertical position above the substantially wicking substrate or such that the solvent within the solvent applicator is in communication with the substantially wicking substrate.

In a more preferred embodiment, the object shaped solvent applicator holder is an animal, plant, or man-made (e.g. rocket ship, automobile, or derrick shaped) holder.

A preferred embodiment of the present invention is a substrate coloring kit, similar to an old-fashioned chemistry laboratory kit, comprising a substantially wicking substrate, a wicking substrate holder or container, a solvent applicator for applying solvent, an applicator holder, and a pen for applying ink comprising one or more colored dyes.

A more preferred embodiment of the present invention comprises a container for developing a colored substantially wicking substrate. The container comprises a top tray openably connected to a bottom tray to form an interior compartment when the top tray is placed in contact with the bottom tray to close the container; a suspending means for suspending a substantially wicking substrate within the container; and a solvent dispenser for dispensing a solvent to the substantially wicking substrate.

In another preferred embodiment, the top tray, the bottom tray or both comprise one or more protrusions located on the interior face of the top tray, the bottom tray or both to hold the substantially wicking substrate away from and prevent the wicking substrate from adhering to or coming in contact with the majority of the interior face of a top tray, bottom tray or both.

In a preferred embodiment, the protrusions are located randomly about the interior face of the top tray.

In another preferred embodiment, the solvent dispenser is a sponge, trough, plastic mesh, or other suitable porous material through which solvent can flow.

In a more preferred embodiment, the container includes a holder for holding a substantially wicking substrate, ink, solvent or any combination thereof. In another preferred embodiment, the container includes a tray and is openably connected to the bottom tray by one or more hinges. In another preferred embodiment, the container optionally includes a clasp, a snap-down buckle, or closure mechanism. This clasp or snap-down buckle moves or rotates to permit the container to be opened. Rotation or movement in the opposite direction and through the snap position holds the container in closed configuration, for example during solvent-induced coloration of the wicking substrate. The Office Depot clear Project Case (Office Depot item #444-112) provides an example of a container with hinges and a closable snap-down buckle. The dimensions of this Office Depot Project Case are 318 mm×267 mm×44 mm; this size easily accommodates US letter-size sheets of paper. Other sizes of container are possible.

In a preferred embodiment with respect to the aforementioned container and in a manner to prevent and control solvent leakage from the container, the edges of the top tray, the edges of the bottom tray, or the edges of both the top tray and the bottom tray contain a water-containing or solvent-containing means such as a gasket. Clasp or snap-down closure of the container by bringing the top tray into contact with the bottom tray brings the solvent-entrapping means into play and provides the user with a container that keeps the solvent inside even if the user adds more solvent than is needed to develop the coloration on the wicking substrate.

In a preferred embodiment, a solvent-containing gasket is made of flexible, but stiff rubber or silicone material forming an assembly permanently attached to the top tray, bottom tray, or both trays.

In another preferred embodiment, a solvent-containing gasket assembly may have features such as a groove in the flexible gasket on or near one tray edge (e.g. top tray) parallel to that edge and a knife-like tray edge on the other edge (e.g. bottom tray) parallel to that edge. Closure of the top and bottom trays brings the knife-edge into the groove much like the "tongue and groove" feature in wooden flooring. The tongue and groove nature of the gasket closure secures the solvent-tightness of the gasket assembly. A polyproplylene one-quart, "Servin Saver™" food storage container (manufacturer's number 4020-RD-CHILI) manufactured by Rubbermaid® Industries has a rubber-like or silicone-like gasket around the top edge of the container with the water-seal and solvent-seal properties intended for the present invention. The Office Depot clear Project Case (Office Depot item #444-112) has a grooved top edge and a knife-edge bottom edge design of the kind of container described in this invention, but not the rubber or silicone solvent-containing gasket design. One practiced in the art of plastics manufacture can produce the tongue and groove gasket seal described here for the present invention.

In a preferred embodiment, the material composition of the top tray, bottom tray, protrusions, suspending means, solvent dispenser, solvent-containing gasket, and excess solvent-entrapping means are made of plastic (e.g. polypropylene) or other materials which are not subject to chemical change or physical distortion induced by water or other solvent used in color development on the substantially wicking substrate.

In another preferred embodiment, the container optionally comprises one or more ports for introducing into the container solvent from the exterior of the container to the interior of the container wherein the port is in communication with the solvent dispenser inside the container.

The holder for the substantially wicking substrate and the solvent dispenser have dimensions such that snap-down closure of the container presses the wicking substrate between solvent dispenser and the holder, thus keeping the wicking substrate in place and providing physical contact between the wicking substrate and the solvent dispenser within the container during the solvent-induced coloration process of this invention.

In another preferred embodiment, the container optionally comprises an excess-solvent entrapping means within the container located at the end considered the bottom end when the container is held in a vertical operational position. This excess-solvent entrapping means can be a sponge running the length and depth of the container side considered the bottom. If the container used has the dimensions of the aforementioned Office Depot Project Case, the dimensions of this solvent entrapping sponge can be approximately 44 mm×6 mm×(the linear dimension of the selected bottom edge).

In a preferred embodiment of the present invention, the ink containing the dyes or the dye mixture optionally comprises an ink holder means, such as an ink cartridge, in contact with and held against the substantially wicking substrate such that solvent can permeate into the ink cartridge during the process of solvent migration to color the wicking substrate. The ink cartridge or ink holder is preferably a porous material designed to permit solvent to reach the dyes in the ink and to permit at least a portion of the dyes to dissolve and to penetrate and permeate into the substantially wicking substrate during the solvent-induced coloration process. The ink cartridge or holder can be itself a piece of substantially wicking substrate containing a concentration of ink that contains the dyes or the ink cartridge can be a part of the sheet of wicking substrate. The ink within the ink cartridge can be dried or partially dried. Almost any porous material currently used by those skilled in the art of pen manufacturing can be used for manufacture of the ink cartridge means in this embodiment of the present invention. A preferred shape for the ink cartridge is flat and of dimensions to suitably permit delivery of ink so as to color almost the entire surface of the wicking substrate beyond the region defined as the origin during solvent-induced coloration. However, flat is not the only possible shape for the ink cartridge; other shapes are also suitable. The principal requirement for the ink cartridge is that solvent be able to dissolve at least a portion of the ink, and to permit the ink to enter the substantially wicking substrate at the point of origin to permit the coloration of the surface of the wicking substrate.

The amount of dye contained in an ink holder or cartridge means can be substantially more than can be applied easily at the defined origin ink zone of the substantially wicking substrate using an ordinary ink pen. For example, a pen such as the Sanford® Uniball micro blue pen can be used as a source of ink containing dyes. One of the Sanford® Uniball micro blue pens was used to draw lines back and forth overlapping and touching each other on a sheet of Fisher Scientific chromatography paper, catalog 05-714-1 to completely cover the surface and densely color a 10 mm×40 mm rectangular area of the chromatography paper. After doing this pen coloration in triplicate and drying the solvent from each colored paper sample for one day, the mass of dried ink transferred to the paper in this manner was found to be 0.5 mg+/−0.2 mg on each sheet. This pen-colored sheet is defined as Specimen A. In another experiment, most of the ink from the Sanford® Uniball micro blue pen was eluted from the ink cartridge within this pen using ethanol and deposited into a glass Petri dish. After partially drying the eluted ink in the glass Petri dish, small pieces of this same chromatography paper were wetted with the concentrated ink, dried for a day, and cut into 10 mm×40 mm pieces of intensely colored Fisher Scientific chromatography paper, catalog 05-714-1. Each of these 10 mm×40 mm densely and darkly colored pieces of paper was found to have a mass at least 5 mg greater than the same size uncolored piece of the same paper. The comparative 5 mg increase in mass represents the mass of ink contained in each densely colored 10 mm×40 mm piece of the chromatography paper processed in this way. A densely colored sheets is defined as Specimen B. The 5 mg of ink in Specimen B is about ten times as much ink as in Specimen A, i.e. as can be applied easily by using the pen as a pen to color the origin of the wicking substrate. Specimen A and Specimen B were used to produce a single colored wicking substrate for comparative purposes using the container described herein. The density of coloration from Specimen B was markedly and obviously much more intense than from Specimen A. Sophisticated production of ink cartridges like Specimen B would be possible by one skilled in the art of ink cartridge production for ink pen purposes.

In a preferred embodiment, the ink cartridge is optionally held in physical contact with the substantially wicking substrate by pressure. For example, the holder on one side of the container applying pressure to the ink cartridge, applying pressure to the substantially wicking substrate, applying pressure to the solvent dispenser on the other side of the container, said pressure activated by closing the top tray of the container onto the bottom tray. The temporary closure during color development and separation may be facilitated by snap closure of the container. The user then proceeds with color development of the substantially wicking substrate by adding solvent. Alternatively, two or more sheets of substantially wicking substrate could be simultaneously colored simply by extending the sandwich design. For example, the user can squeeze a densely-colored porous ink cartridge between two sheets of substantially wicking substrate and hold this sandwich design in place within the container between the holder and solvent dispenser by closing the top tray onto the bottom tray.

The ink cartridge can optionally be cemented or otherwise permanently attached to the wicking substrate to define the region of the origin of the color separation process with the intention that this region will be cut off and removed as one of the steps of shaping.

In a preferred embodiment the ink cartridge is permanently attached to the substantially wicking substrate and covered with a solvent impermeable covering as taught in Arens (U.S. Pat. No. 5,389,426), i.e. a coating that can be of any composition such that the coating be insoluble in the solvent of the present invention and insoluble in the dyes and ink of the present invention. Arens suggested that the coating be a UV-cured material such as that made by Pierce & Stevens, Inc. of Carol Stream, Ill. 60188. Alternatively this coating can be cellophane adhesive tape or indeed almost any tape. This coating can also be acrylic paint or any of a considerable number of other water-insoluble paints, varnishes, coatings. The coating can be any material with the properties of being insoluble in the solvent of the present invention and insoluble in the dyes and ink of the present invention. Coating the ink cartridge in place can hide the ink cartridge from view and can prevent the ink from transferring to a table top or other surface if the substantially wicking substrate with coating side down were accidently placed onto a wet surface. Arens (U.S. Pat. No. 5,389,426) fails to teach, suggest or motivate one to separate a first dye and a second dye over a surface area of the substantially wicking substrate by moving the dissolved dyes from the defined region (origin) where the dyes were initially applied into a totally different region on the surface of the wicking substrate to color a region a substantive distance, possibly many centimeters, from the origin. Permanently attaching the ink cartridge to the substantially wicking substrate with a solvent impermeable covering is distinctly different from Shinohara (U.S. Pat. No. 5,756,166). Shinohara uses a color-carrier substance sheet consisting of a water-permeable substance such as felt or the like to which starch or paste is applied, with the intention that "a powdery water-soluble coloring agent or pigment" be applied to the felt color-carrier substance sheet. This color carrying felt is held in place by mechanically pressing the felt to the corolla section of the artificial flower by means of a pin device Shinohara calls a holder 5. The Shinohara process and patent are further distinctly different from the present invention. Shinohara teaches the means and process to produce "an artificial flower capable of exhibiting, with a lapse of time, a variation in color development sufficient to provide a user with visual pleasure as in a natural flower . . . when it is fed with water." When the artificial flower is fed (i.e. a biological process) with water and colored "as in a natural flower", the process in Shinohara is finished. Shinohara fails to teach, suggest, or motivate one subsequently to go on to further steps taught in the present invention including shaping (as taught here, for example, by tearing, cutting, or folding) of the colored product because these subsequent shaping steps would be akin to mutilating the natural, real-life-like, biologically-analogous process of flower coloration as taught in Shinohara.

In another embodiment, the ink cartridge optionally slides into or fits within a pocket in the substantially wicking substrate or in the container. Alternatively, the ink cartridge is held in a groove or other mechanism designed for holding the ink cartridge in place on the wicking substrate. The ink cartridge can also be held in an affixed configuration in contact with the substantially wicking substrate by the variety of means of affixing mentioned elsewhere in the description of embodiments of the present invention.

Another embodiment of the present invention comprises a substrate coloring kit comprising one or more of the following: a substantially wicking substrate, a container, a solvent dispenser, a holder, a solvent applicator for applying solvent, an ink cartridge containing ink comprising one or more colored dyes, a pair of scissors or other shaping element, and a support.

In another embodiment, the kit further comprises a solvent for diffusely coloring the substantially wicking substrate with the colored dyes to produce a watercolor-like or ethereal effect on the substantially wicking substrate.

In a preferred embodiment the ink is initially invisible to the naked eye requiring a secondary treatment for visualization.

In a more preferred embodiment, the secondary treatment is illumination of the substantially wicking substrate using wavelengths selected from between about 200 nm-1500 nm irradiation, heating, chemical treatment, or a combination thereof.

In a preferred embodiment the means of display includes illumination for enhanced visualization of the colored, shaped, assembled, and affixed wicking substrate.

In a preferred embodiment, the solvent or the ink or both contain a fragrance such that the colored wicking substrate and the final product have a scent. Alternately, the scent can be provided as a component of a kit to be added by the user after coloration of the wicking substrate.

It is an aspect of one embodiment of the present invention to provide a new method to create art and artistic design.

It is another aspect of one embodiment of the present invention to color a substantially wicking surface using ink producing a watercolor like effect.

It is yet another aspect of one embodiment of the present invention to make jewelry.

It is a further aspect of one embodiment of the present invention to make a greeting card.

It is still another aspect of one embodiment of the present invention to make art or design suitable for framing or displaying.

It is a further aspect of one embodiment of the present invention to provide a kit for coloring substantially wicking surfaces using chromatography instructions to produce watercolor or tie-dye like effects.

It is a further aspect of one embodiment of the present invention to provide an apparatus for use in processing and developing a watercolor like effect on a substantially wicking substrate.

It is an additional aspect of one embodiment of the present invention to provide a teaching tool for chromatography principles.

A preferred embodiment of the present invention is a substrate coloring kit comprising a substantially wicking substrate, a solvent applicator for applying solvent, and a pen for applying ink comprising one or more colored dyes.

Additional objects and advantages of the present invention will be apparent in the following detailed description read in conjunction with the accompanying drawings and figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Definitions

Figure 1:
FIG. 1 illustrates a substantially wicking substrate dyed according to one embodiment of the present invention.

The word "a" as used herein means one or more.

The word "ink" as used herein means a dispersion of a pigment or a solution of a dye either being permanent, semi-permanent or non-permanent in a carrier vehicle. The ink can comprise solid dye particles, a mixture of dye particles, or a dispersion of solid dye particles within a matrix, paste, or starch system.

The word "solvent" as used herein means one or more selected from water, alcohols, aliphatic hydrocarbons, amides/amines, aromatic hydrocarbons, halogenated hydrocarbons, ethers, esters, amines, acetates, ketones, citrus oil, glycols, and glycol ethers, acids, bases, aldehydes, soaps, detergents, surfactants and dimethyl sulfoxide (DMSO) either alone or a combination thereof.

The words "substantially wicking substrate" as used herein means a separation phase matrix.

Different colored inks and different brands of ink contain different chemical molecules, for example dyes or colorants with chemically distinct properties as a result of the organic, inorganic, or other substances or molecules contained therein. The combination of different colored molecules or particles within ink can create colorful ink patterns on a porous substrate or substantially wicking substrate such as paper (but not limited thereto) when the ink is applied to the paper and a solvent is introduced to the paper thereafter.

Capillary action or gravity assisted capillary action draws the solvent through the substantially wicking substrate where the molecules of the dye initially reside (the initial location of the dyes on the surface of the wicking substrate or in a dye cartridge touching the wicking substrate defines a region of reference on the wicking substrate). The solvent mobilizes the molecules of the dye and carries the molecules away from the defined reference point of origin where the ink is originally deposited. The molecules in the dye are deposited or carried throughout the substrate along the path of the solvent front to diffusely color the substrate with the dye molecules thereby creating coloration patterns. The distance the dye molecules travel away from the defined point of origin may be many centimeters; this distance being dependent upon several factors: the uniformity or non-uniformity of solvent addition to the top, sides, edges, or surface of the wicking substrate, the duration of time the substrate is exposed to the solvent, the chemical composition of the dye, the chemical composition of the solvent, the presence of organic or other solvents in the ink, and the solvent type applied to the substrate. These factors can be controlled by the user. Inks consist of dye molecules, pigments, colorants, or colorant particles dissolved or suspended in an ink solvent. Sometimes the dye molecules start to move as the applied solvent moves past the defined region on the substantially wicking substrate. Sometimes the dye zone (defined as the place on the substantially wicking substrate that the dye resides which may be different from the defined origin location) moves through the wicking substrate for a distance, then stops moving even though the applied solvent continues to pass through the dye zone. This initial migration then "stoppage" possibly is the result of the solubilizing effect of the solvent initially within the ink ("ink solvent") being carried by the added coloration solvent and this solvent mixture carrying the dye for a distance before the applied coloration solvent carries the "ink solvent" away from the dye whereupon the dye moves at a much slower rate of migration.

Different colored dyes within an ink-blend will often separate from each other by distances of millimeters to many centimeters on a substantially wicking substrate such as filter paper, chromatography paper, woven or pressed cloth, or paper towel and or other substrates that will be known to one of ordinary skill in the art. However the substantially wicking substrate is not limited to natural products as synthetic products such as a porous substrate made of rayon or any other synthetic product known by one of the ordinary skill in the art would suffice. The simple process of wetting a region of the ink-spotted substantially wicking substrate with one or more solvents, i.e. chromatographing the ink on the substantially wicking substrate with water, and/or an alcohol solvent for example begins the method. During the process of separating the dyes in the ink, the substantially wicking substrate becomes colored with the ink outside of the defined zone of application and over a surface area that is greater than the surface area to which the ink was originally applied thereby coloring a larger area of the substantially wicking substrate. This larger area of coloration may represent from approximately 2% to approximately 99% of the entire surface area of the wicking substrate.

The separated colors on the substrate create colorful and beautiful designs or regions on the substantially wicking substrate. Tie-dye like effects can be created. The path of the solvent front can be altered by applying hydrophobic substances to the substantially wicking surface, or by interrupting the continuity of the wicking surface (for example, by cutting slits or holes in the wicking surface). Non-uniformity of solvent addition and application assists in the wavy, non-linear, globular, thin and thick coloration of the wicking substrate.

The ink or dye can be applied to a dry piece of substantially wicking substrate or to a substantially wicking substrate which has previously been wetted with one or more solvents, such as water. Previously wetting the porous substrate can 1) help to draw the ink into the substrate faster during the dye application process, 2) speed up the chromatographic process, and 3) change the appearance of the developed colored substantially wicking substrate.

Shapes (e.g. hearts, leaves, flowers, animals) or designs can be formed from the differentially colored regions on the substantially wicking substrate or porous substrate and several colored wicking substrates are often used to assemble a collection of colored surfaces for affixing onto a support. These colored surfaces, designs or regions on the paper are further processed. Processing of the colored regions include drawing, cutting, shaping, tearing, folding, scenting, re-coloring, bending, curling, twisting, slicing, shredding, hammering, piercing, or otherwise deforming, adulterating, or altering from the colored aspect resulting from solvent-induced coloration. The processed regions can then be affixed to a support, (for example, a card stock or other surface or three-dimensional support) to enable the user to create an artistic design.

One embodiment of the present invention provides for a system and method for creating ink art. The process begins with applying ink to a defined reference point of origin on the substantially wicking substrate. A solvent is applied to an edge portion of the substantially wicking substrate thereafter. The texture of the substantially wicking substrate allows the solvent to move via capillary action through the substantially wicking substrate carrying some of the colored molecules from the dye from the defined point of origin to color a larger region of the substantially wicking substrate beyond, but possibly including the original ink mark.

The different colored molecules are separated or partially separated within the substantially wicking substrate by chromatography that includes processing and developing the separation of the dyes in the ink on the substantially wicking substrate, often in very irregular coloration regions. Regions of the substantially wicking substrate are cut out, further processed, and assembled onto a support to produce the final "artwork" product.

All or a portion of the diffusely colored substantially wicking substrate can be shaped into a form. The form can be applied to a support wherein the colored form is displayed. Many shaped forms from multiple colored wicking substrates can be assembled into the final affixed product.

Another embodiment of the present invention is a system and method for producing a diffusely colored effect on a substantially wicking substrate. The effect is produced by applying an ink comprising a dye to a defined reference area on the substrate such as paper. In another embodiment, an ink can be applied to two or more defined locations of the paper. To the inked paper a solvent is applied to move a dye molecule about the paper and away and out of the defined area to produce a diffusely colored effect. The effect is similar, for example, to tie-dye or a water color.

Yet another embodiment of the present invention is a system and method for producing a diffusely colored effect on a substantially wicking substrate. The effect is produced by applying an ink comprising two or more dyes to a defined reference area on the substrate. The substrate is wicking (porous) and can be, for example, paper, cloth, filter paper, chromatography paper, woven or pressed cloth, paper towel or food products such as bread, rice cake but not limited thereto. Synthetic substances such as Dacron or Rayon (but not limited thereto) that form substantially wicking substrates would also suffice.

In another embodiment, an ink comprising two or more dyes can be applied to two or more defined reference locations of the paper. To the inked paper a solvent is applied to move the dye colorant about the paper away from and out of the defined areas to produce a diffusely colored paper. For example, if there are two dye application defined regions and both are equidistant or nearly equidistant from an edge of the substrate and the solvent is applied at that edge, the colorant in both defined regions would move more or less in the same direction, perpendicular to the edge; whereas, if the solvent is added between two dye application defined regions, the colorant in the two defined regions would move in opposite directions away from the solvent application site. One can envision three or more dye application defined regions placed in a more or less circular pattern. If the solvent is applied in the center of that circle, the colorant in the defined regions would move in a more or less radial fashion spreading away from the center.

Another embodiment of the present invention provides a kit comprising ink(s), a substantially wicking substrate, a solvent, a solvent applicator, an applicator holder, and instructions.

In an alternate embodiment, card stock which is a substantially wicking substrate receives the initial sample of ink defining a region. The solvent (e.g. water) is dripped slowly onto the surface of the card stock to create a radial or other design on the card stock. The solvent moves through the substrate and the defined region by capillary action creating a design as molecules of dye move through the paper.

The solvent can be introduced to the substrate through a wick in a container holding the solvent; this solvent holding container is a solvent applicator. The solvent moves to the substrate through the wick via gravity or capillary action. A solvent applicator container may be in the shape of a plastic transfer pipettor wherein a wick is placed in the tip. Part of the bulb portion of the pipettor can be removed (cut off) for loading of the solvent.

Another embodiment of the present invention provides for a system for creating substrates colored in a tie-dye or water-color effect. The system includes a holder device for suspending the solvent applicator container over the substantially wicking substrate. The holder device may be in a recognizable shape such as a spider, dinosaur, flower, rocket, derrick, or house. The holder device supports a solvent applicator container such as a pipette which may have a wick at the tip. The solvent applicator container contains solvent wherein the solvent applicator is held in a substantially vertical position over the substantially wicking substrate such that the solvent is delivered to the substantially wicking substrate via gravity. The tip of the solvent applicator closest to the substantially wicking substrate may be in direct contact with the substantially wicking substrate or it may be in close proximity such that the solvent is in communication to the substantially wicking substrate for example via the wick at the tip of the solvent applicator container. Further the holder device may be in one of the following shapes—Spider, Flower, Rocket, House, Bug, fly, bee, wasp, Alligator, or Tyrannosaurus Rex.

For example a TYRANNOSAURUS REX applicator holder could stand like a tripod with tail and two hind legs as the three legs of the tripod or base on a surface. Alternatively, an applicator holder could hold the solvent applicator with its two small front legs and large open mouth twisted so the jaws are horizontal instead of vertical and grasps the bulb of the solvent applicator in its jaws.

In an alternative embodiment, a portion of the substantially wicking substrate for example card stock could be introduced to a reservoir of solvent wherein the solvent wicks through the card stock to diffuse and move the dye molecules in an artistic pattern through the card stock. For example a lily pad shape having a stem/wick formed from a wicking substrate wherein the wick of the substantially wicking substrate brings the solvent to the ink via capillary action.

In another embodiment, the porous stationary phase could be precut into shapes to "teach" the experimentalist user what other variations might be explored. Almost all commercial ink samples produce interesting designs. The inks to be chromatographed can also be scented with a fragrance or contain fluorescent or phosphorescent dyes and illuminated to be revealed or to produce an interesting variation in the final product.

In yet another embodiment, the substrate would contain a preprinted template for applying the ink thereto. The template would be arranged to create an artistic image when inked and/or chromatographed. The preprinted template can be made of a dye or pigment. If the template is made with an insoluble pigment like (but not limited to) carbon black, the solvent would not affect the template.

According to yet another embodiment, a kit similar to an old-fashioned "chemistry kit" is provided for chromatography. This kit consists of one or more of the following: a variety of paper sheets, many of them white "filter" or "chromatography" papers; a set of ink pens of different colors, some may be phosphorescent or fluorescent; a waterproof plastic sheet to protect the tabletop or work-surface; (possibly one or more jars or containers: as developing and processing chambers); several plastic pipettors with volume increment markings; one or more solvent delivery system holders or containers; an illuminator, for example, a long wave ultraviolet lamp or apparatus; or LED(s) light source and power supply ("black light") for revealing the phosphorescent or fluorescent dyes; a pair of children's scissors; blank card stock paper for greeting cards; pin-backs, broaches, wire loops, or spring clips for making jewelry; and an instruction booklet with a few suggestions and examples of results. Special pens that deliver more ink than would be desirable in normal writing use (bleeder pens) may be part of the kit.

According to yet another embodiment, a kit similar to an old-fashioned "chemistry kit" is provided for chromatography. This kit preferably comprises one or more of the following: a container with top tray and bottom tray; a container with top tray and bottom tray connected via one or more hinges; a container comprising top tray, bottom tray, one or more hinges connecting top tray to bottom tray, and a closure mechanism to maintain the top tray temporarily in contact with the bottom tray; a container comprising top tray, bottom tray, one or more hinges connecting top tray to bottom tray, a closure mechanism to maintain the top tray temporarily in contact with the bottom tray, and a gasket mechanism to provide water or solvent tightness for the container; a holder for the wicking substrate; a solvent dispenser; an excess-solvent entrapping means; a variety of paper sheets, many of them white "filter" or "chromatography" papers; a variety of porous wicking substrate sheets of some other composition than paper; a variety of porous wicking substrate sheets with ink cartridges attached; a set of ink pens of different colors; some may be phosphorescent or fluorescent; a variety of ink cartridges containing dyes of different colors, some may be phosphorescent or fluorescent; a waterproof plastic sheet to protect the tabletop or work-surface; (possibly one or more jars or containers: as developing and processing chambers); several plastic pipettors with volume increment markings; one or more solvent delivery system holders or containers; an illuminator, for example, long wave ultraviolet lamp or apparatus; light emitting diode (LED) light sources and power supply ("black light") for revealing the phosphorescent or fluorescent dyes; a pair of children's scissors; blank card stock papers for greeting cards; pin-backs, broaches, wire loops, or spring clips for making jewelry; and an instruction booklet with a few suggestions and examples of results. Special pens that deliver more ink than desirable in normal writing use (bleeder pens) can be part of the kit. Additional ink cartridges designed for use in the container can also be part of the kit.

The instructions direct the user to start with tap water as the solvent system and perhaps just one ink pen or an ink cartridge with just one ink to produce the strange colorful patterns (nearly effortless ethereal expressions) in the developed substantially wicking substrate colored by the process. Repeat the process to see what happens (good science!). Repeat the process with a different colored pen or an ink cartridge with just one ink. Repeat the process with several different colored pens or several ink cartridges with several different color inks. Repeat the process with some rubbing alcohol in the water. Repeat the process with a little soap in the water. Repeat the process with a little vinegar in the water. Repeat the process with vinegar instead of water. Repeat the process with deionized or distilled water. Repeat the process with a little table salt in the water. These are examples of scientific investigation.

The system and method of the present invention may create unusual patterns during the development phase of the separation process. The papers should not necessarily be all identical. Some may have non-uniformities in the fiber structure of the paper. These non-uniformities cause strange designs during the development process.

Referring now to FIG. 1, one embodiment of a substantially wicking substrate being dyed is illustrated. The figure shows two panels (A and B) which represent two views of the same colored wicking substrate sheet (Fisher Scientific catalog #05-714-1) which has been dyed with many fluorescent dyes including dyes from Crayola® fluorescent children's marking pens. The developed image as viewed is enhanced upon exposure to a user defined wavelength selected to enhance the color of the dye and substrate. Panel A is the colored sheet as viewed by front illumination with room light. Panel B is this same sheet viewed in a dark room under back illumination with a "black light" illuminator emitting long wavelength ultraviolet irradiation at 366 nm. The substantially wicking substrate in FIG. 1 is approximately 220 mm×300 mm in its two longest dimensions; the third dimension is approximately 0.2 mm. The third dimension is thin enough that the color of the fluorescent radiation produced by ultraviolet excitation on the back side passes through the paper to enable the visible color to be strikingly visible and to be easily photographed. The solvent traversed the entire length (approximately 300 mm) of the sheet of wicking substrate and the faint blue fluorescent dye traversed essentially the entire 300 mm length of the sheet.

Figure 2:
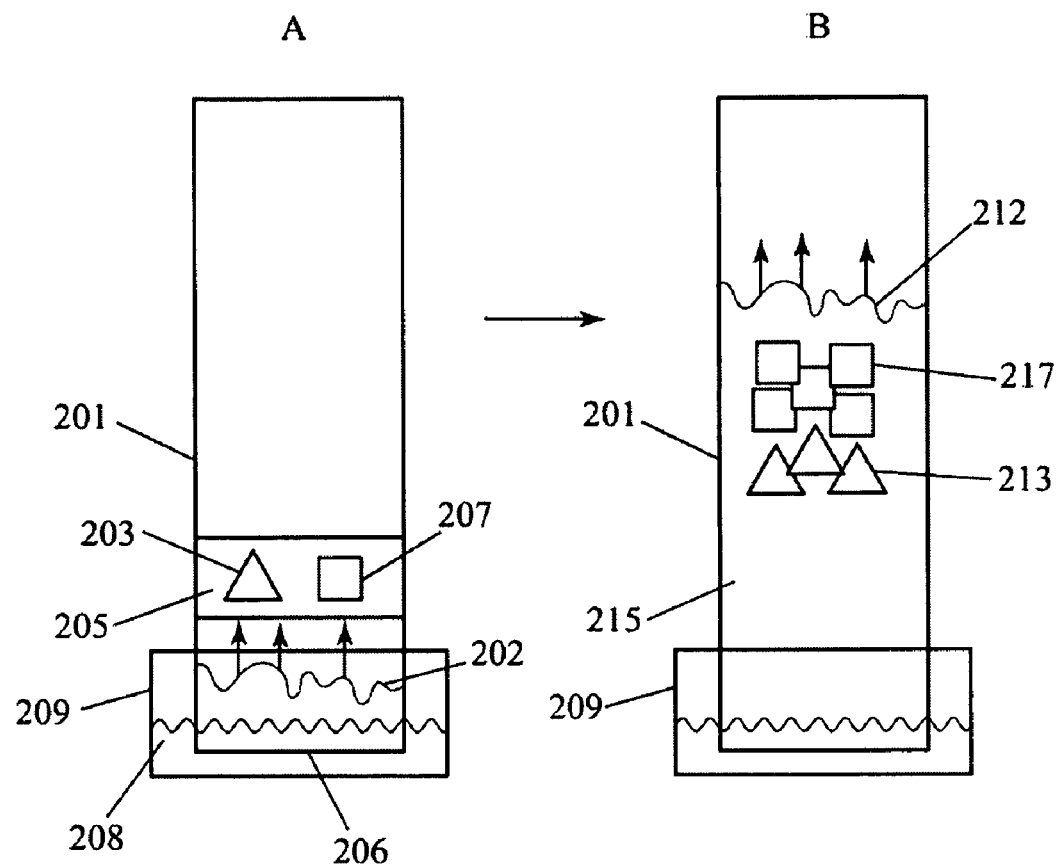
FIG. 2 illustrates a solvent-induced substantial separation of a first dye from a second dye on a surface to create a colored substantially wicking substrate.

Referring now to FIG. 2, a method of producing a watercolor or like effect on a substantially wicking substrate in the absence of brushes is illustrated.

The following materials are suggested for use but are not limited thereto:

1. Plastic Sheet. Covering to protect tabletop from ink stains; e.g. 4 mil×3'×4'
2. One or more Glass or Plastic Chamber(s) (dimensions not critical). This could be a 1 quart wide mouth Mason Jar; could be more rectangular, e.g. 8" tall, 4"×8" base
3. Chromatography Paper. Many sheets, not necessarily all the same composition. Should fit conveniently and appropriately into Chamber item 2. above. All or only a few sheets with "marked" origin lines; could have some sheets for radial processing and development (described below)
4. Pens, colored, to provide inks for separation using one embodiment of the present system and method 5. Set of overlays, patterns, masks with outlines of different shapes, e.g. hearts, stars, trees, dog, cat, etc
6. Blank card stock, e.g. single fold, could be an assortment of sizes or one size, e.g. 5"×7", dozen or more
7. Envelopes to fit blank card stock
8. Scissors
9. Glue stick
10. Instruction book
11. water or other solvent
12. tape (e.g. masking tape or "scotch" tape)
13. sharpened pencil.

Panel A of FIG. 2 indicates the use of a pen (for example one from item 4 of the preceding paragraph) to apply ink having a first dye molecule 203 and a second dye molecule 207 applied to define the reference region of the dye zone 205 of the surface of a substantially wicking substrate 201, for example one or more sheets of paper. As ink is drawn by capillary action into fibers of the paper 201, a pen is moved along an origin line in a direction for example to the right in a manner that allows the ink to deposit in a wide line or alternatively the ink may be applied as one or more spots. It is fine if the ink is applied non-uniformly in the application zone 205 along the origin line, i.e. in bulges and thin spots. Further, the ink can be applied to a portion of the substantially wicking substrate or alternatively the ink can be applied to the entire substantially wicking substrate. The wicking substrate 201 in Panel A may have dimensions of a few centimeters by many centimeters, e.g. approximately 4 cm in width (bottom line 206) by approximately 20 cm in length (side designated by 201). The solvent may traverse a distance of substantially more than half the longest dimension as shown in Panel B, i.e. a distance approximating 20 cm, to produce coloration of most of the wicking substrate surface.

According to another embodiment, a diffuse color effect is produced on a substantially wicking substrate by re-inking the defined origin region 205 or 215 to "load" more ink to the substantially wicking substrate such as a coffee filter paper. Alternatively ink from a second or third pen could be applied at the defined origin region 205 or 215 before or during processing and development of coloration. The user could moisten the substantially wicking substrate at the defined origin region 205 before applying ink to "bleed" ink or "load" the substantially wicking substrate with more ink or alter the design. Pens that deliver more ink than would normally be delivered by an ink pen in normal use are better because the intensity of color of the resolved colored zones is increased during processing. Color intensity generally increases with amount of ink put on the substantially wicking substrate (e.g. paper) prior to processing and development.

The chamber 209 is prepared by pouring solvent 208 into it to a height of about 1 cm of water or less (perhaps 20 mL). The substantially wicking substrate 201 is placed vertically into chamber 209 so that bottom edge 206 of paper 201 touches or is under the surface of the water or solvent. Solvent 208 should immediately start moving up substantially wicking substrate 201 by capillary action as indicated by the arrows. Solvent front 202 moves in the substantially wicking substrate.

A user may secure substantially wicking substrate 201 to chamber 209 so that it will not fall into chamber 209 as the substantially wicking substrate gets wet. For example, substantially wicking substrate 201 can be secured to chamber 209 by a clamp, tape, or bending the top of the sheet over an edge of chamber 209 or any other equivalent means. Alternatively, substantially wicking substrate 201 can be suspended above chamber 209 by a support means such as a wire or string either attached to chamber 209 or independent from chamber 209.

Panel B of FIG. 2 illustrates development of the dyed substrate. Capillary action will allow the solvent 208 to slowly move up substantially wicking substrate 201 producing a visible solvent front 212 as more of substantially wicking substrate 201 gets wet with solvent. Solvent front 212 will pass by the defined origin ("ink") region 215 and will start to draw the colored molecules of ink up the substantially wicking substrate to the coloration development zone. Since inks may be mixtures of molecules of different colors, different colored zones 213 and 217 will be produced by this process. In contrast, if the ink contains a monochromatic dye the ink will color the substrate in only a diffuse water color or tie-dye effect. The colored zones 213 and 217 can cover a substantial fraction of the entire surface of the wicking substrate 201.

It is suggested that a user cover the working surface with the plastic sheet, and flatten the sheet. This sheet protects the tabletop or working surface from being stained by dyes in the ink bleeding from pens or wet substantially wicking substrates loaded with ink.

Different colors that are separated during development and processing of the ink indicate different molecules with different chemical structures. These differences cause the molecules to separate from one another as the different molecules interact differently with the solvent and with the paper. Some molecules will attract more strongly with solvent (they will move faster), while some will attract more strongly with paper (they will move more slowly). These differences in rate of movement are reflected in the relative positions of the colored zones as they move up the paper and end up in different regions on the developed and colored substantially wicking substrate art.

Another embodiment is a method for producing a color effect on a substantially wicking surface 201 wherein an ink applied to a wicking substrate is developed after—or before—an ink on the defined origin region is dry. The user removes the water colored substrate after a short running time to apply more ink to the defined region; then returns the processed substrate to a chamber for reprocessing. This could be repeated a few times before solvent front reaches the top of the sheet. This could produce a set of "wavy" overlapping colored zones. For example, it might produce a pattern like the red/white field of the American flag. The user could partially process the substantially wicking substrate (e.g. paper), dry the paper, and start the process again to produce a different result.

In an alternative embodiment, an incompatible, immiscible solution to the solvent can be coated onto or applied at different locations on substantially wicking substrate 201 to divert the solvent from the areas that are coated with the incompatible immiscible solution. The added complexity of the developed pattern contributes to the tie-dye or water color like effect on the substrate.

In another embodiment, a radially colored substantially wicking substrate is produced. In this instance a circular sheet of a substantially wicking substrate (for example chromatography paper) is cut to resemble a "lily pad".

Figure 3:
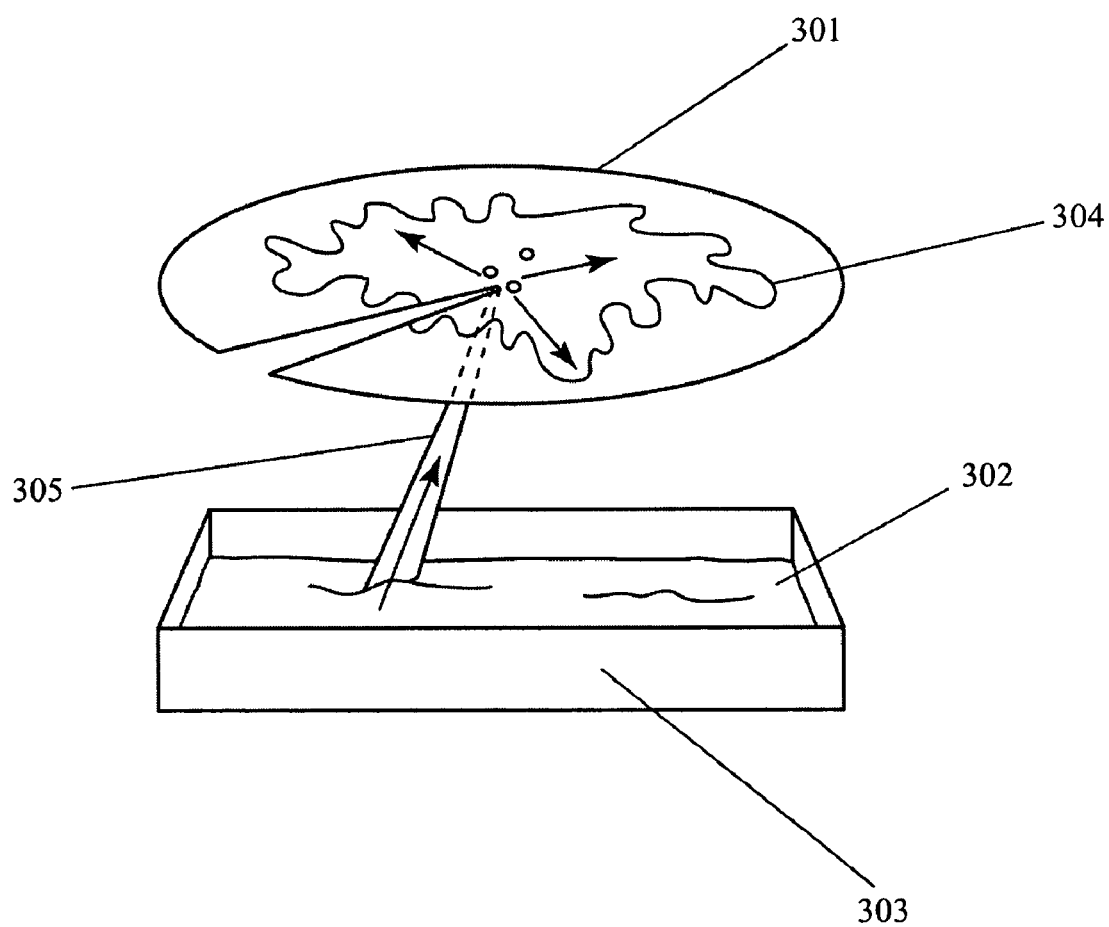
FIG. 3 illustrates application of a solvent to a substantially wicking substrate according to one embodiment of the present invention.

Referring now to FIG. 3, a strip 305 with approximately parallel edges is carefully cut from the edge of circle 301 of a substantially wicking substrate to the center or any location designated by user and carefully bent at an angle, for example 90° but not limited thereto. Strip 305 may be narrow for example about 5 mm. Strip 305 forms the wick for solvent 302 to move from the solvent reservoir 303 up to circular paper 301. Circular paper 301 can sit horizontally on the top of a cup or small glass holding the solvent. The "ink" can be a defined region like a spot in the center of the circle of paper, at the end of the narrow strip, on a small (almost) circle around the center of the chromatography paper where the narrow strip attaches, or combination thereof but not limited thereto.

Still another embodiment provides for producing a different radial pattern on the colored substantially wicking substrate. The steps include applying the "ink" sample as a defined region like a spot or small circle near the center of an intact substantially wicking substrate. Several inks can be applied as a ring or other design or as a series of spots as the defined region. The paper does not have cuts or slits, i.e. not the "lily pad".

Figure 4:
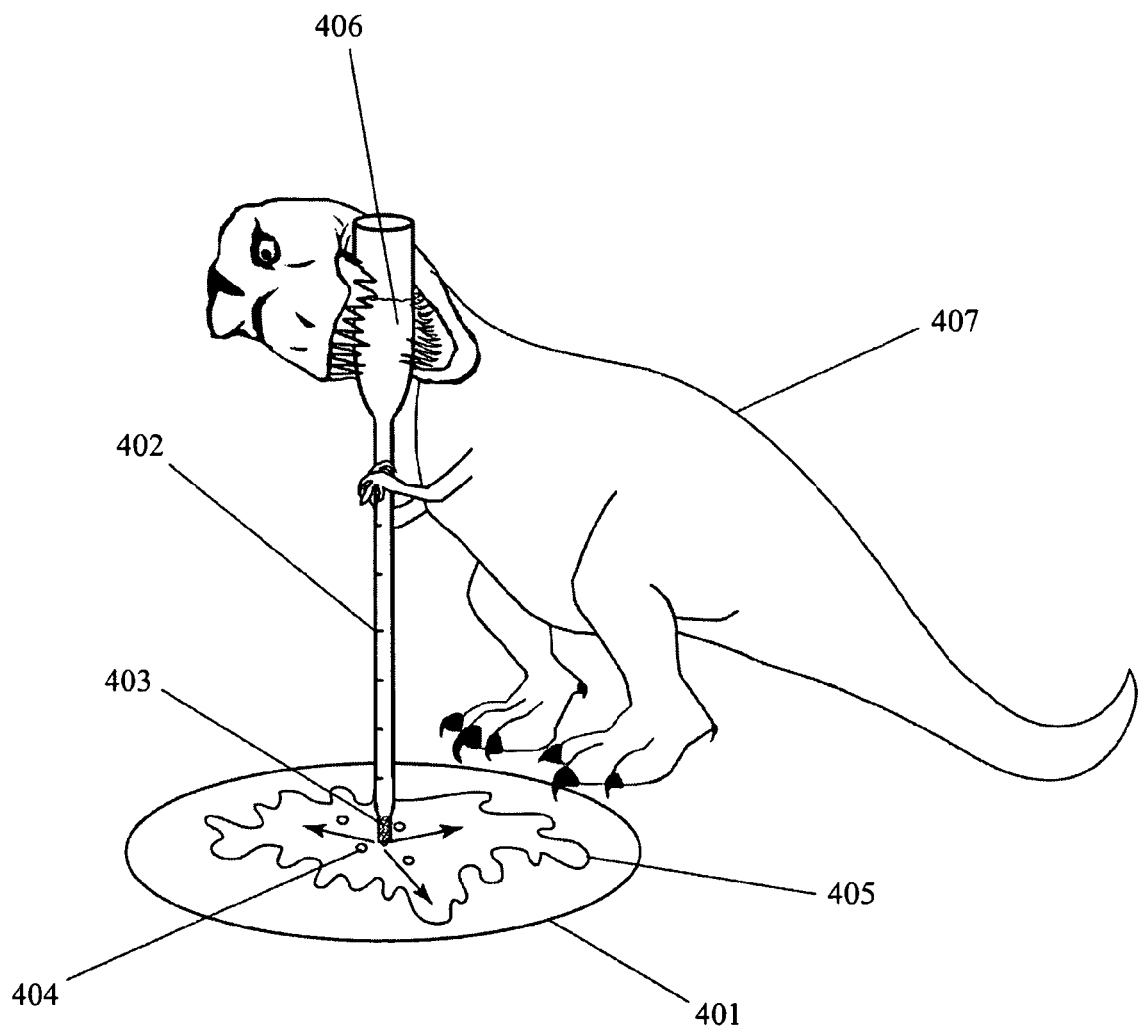
FIG. 4 illustrates a solvent applicator holder.

Referring now to FIG. 4, holder 407 for solvent container 402 containing solvent 406 therein is positioned above substantially wicking substrate 401 to deliver solvent 406 to a location on substantially wicking substrate 401, for example, the center of substantially wicking substrate 401 according to one embodiment of the present invention. Substantially wicking substrate 401 is intact (no slits or cuts) and lying in contact with a surface below, for example a non-solvent-permeable surface (not shown). Alternatively, substantially wicking substrate 401 may be suspended at its edge or at any other portion by for example laying substantially wicking substrate 401 onto a dish such that substantially wicking substrate 401 along its entire area does not make contact with the surface below as the developing colored substantially wicking substrate may be suspended with air above substantially wicking substrate 401 and air below the substantially wicking substrate (not shown). Solvent container 402 may have a porous plug 403 to facilitate transfer of solvent 406 to substantially wicking substrate at a desired rate of delivery. Solvent 406 carries ink in the defined region 404 a distance greater than the area of the application zone (not shown). The solvent front 405 can optionally move across the entire surface of the wicking substrate 401 and can color almost the entire surface area of 401.

Paper, as an example of a substantially wicking substrate, lying in contact with a surface often produces quite asymmetrical designs. Paper suspended above a surface produces considerably more symmetrical designs according to another embodiment of the present invention. Once a desired pattern has developed (it may not be necessary to allow the solvent front to travel the complete width, diameter, or surface area of the substantially wicking substrate, or to the edge) the substantially wicking substrate can be withdrawn from a solvent chamber or the solvent application process can be stopped (for example by removing the solvent applicator from the substantially wicking substrate). This allows the separation process to stop and the further separation of colored zones relative to one another to stop. Stoppage of the coloration of the wicking substrate in this fashion i.e. removal of the further application of solvent provides an example of a finished "wet" colored substantially wicking substrate.

Figure 5:
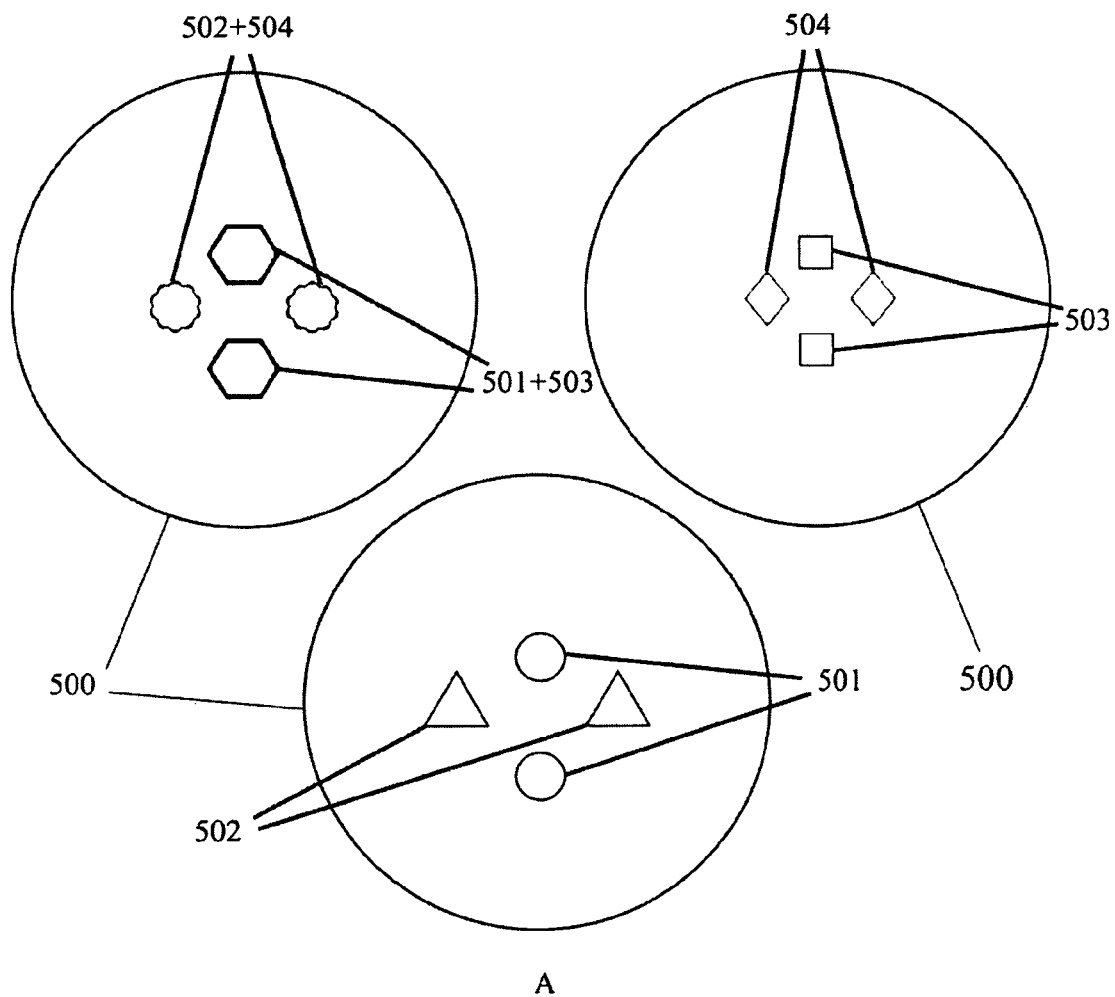
FIG. 5 illustrates application zones or patterns of inks for ink application supplied on the substantially wicking substrate according to one embodiment of the present invention.
Figure 5:
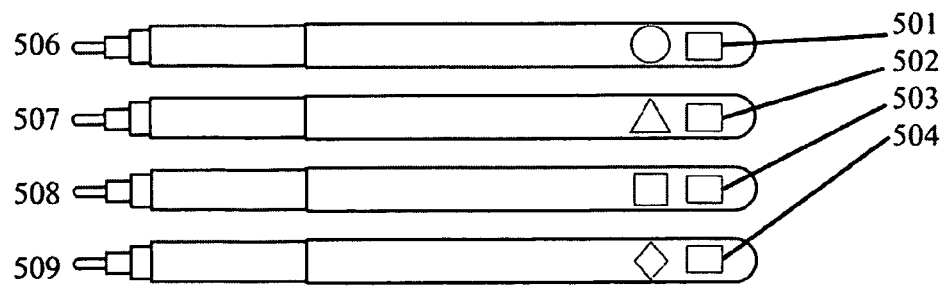

Referring now to FIG. 5A, substantially wicking substrates 500 with defined regions 501, 502, 503, 504 identifying specific ink samples to be placed thereon is illustrated according to one embodiment of the present invention. Referring now to FIG. 5B, applicators 506, 507, 508, 509 having an ink corresponding to the ink required by the corresponding defined region of the substantially wicking substrate is illustrated. A user applies the ink to one or more defined regions 501, 502, 503, and 504 to create an inked substantially wicking substrate. A solvent is applied and the ink within defined regions 501, 502, 503, and 504 migrates under the influence of the applied solvent.

Figure 6:
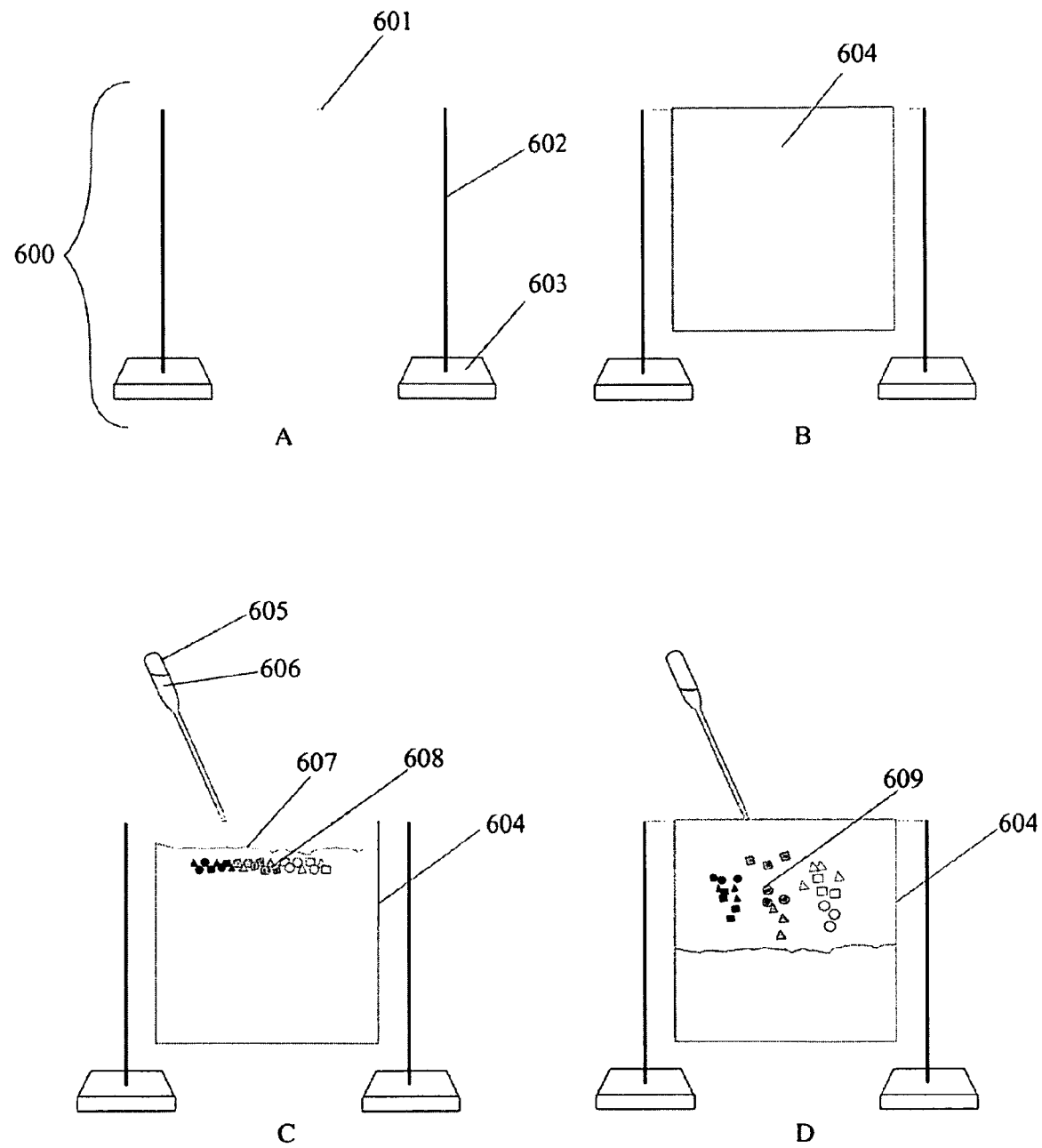
FIG. 6 illustrates a method for suspending a substantially wicking substrate for solvent application according to one embodiment of the present invention.

Referring now to FIG. 6, an apparatus 600 with a base 603 for suspending the substantially wicking substrate for processing and developing according to one embodiment of the present invention is illustrated. According to FIGS. 6A and 6B, frame 602 having suspending means 601 for use in suspending substantially wicking substrate 604 is illustrated. According to FIG. 6C, ink 608 is applied to the defined region of a substantially wicking substrate 604 and solvent 606 is applied from solvent container 605 to a substantially wicking substrate 604 at a location to cause the dye or ink 608 initially in the defined region to migrate as solvent 606 is carried through the substantially wicking substrate 604 in the direction of the bottom edge of substantially wicking substrate 604 by gravity and/or capillary action to produce fully or partially resolved dye molecules 609 (FIG. 6D). The solvent 606 can traverse the entire sheet of wicking substrate 604 and move the dye molecules 609 out of the defined region to cover an area of almost the entire surface area of the wicking substrate 604. The wet substantially wicking substrate can develop or dry while hanging from the suspending means.

Figure 7:
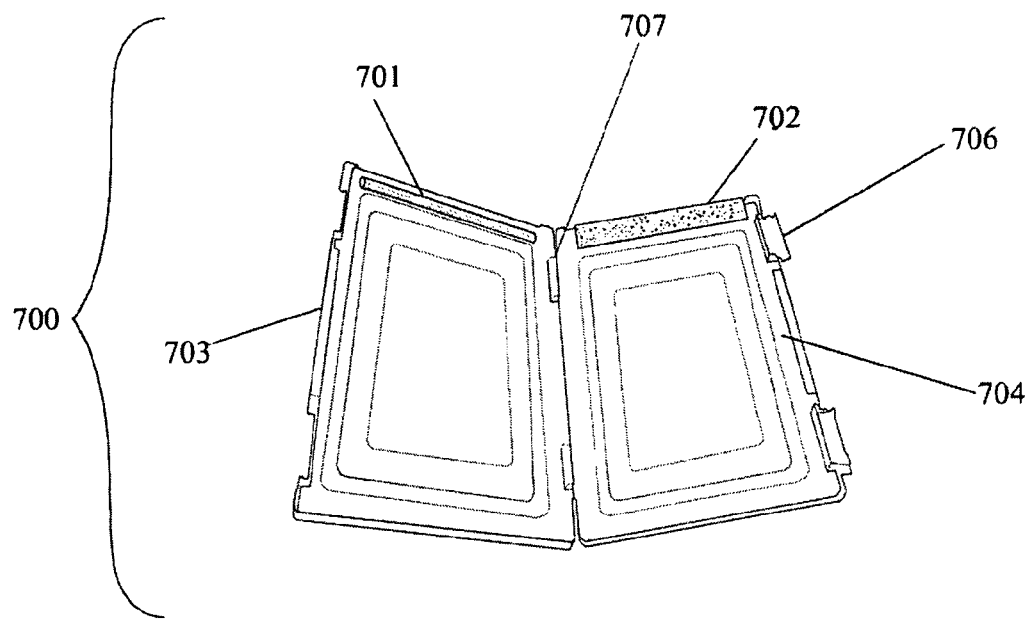
FIG. 7 illustrates an apparatus for developing and or coloring a substantially wicking substrate according to one embodiment of the present invention.
Figure 7:
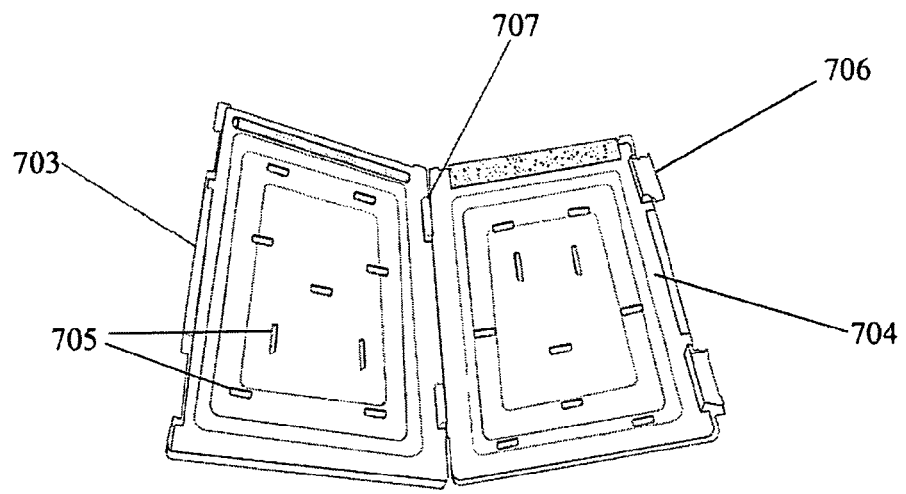

Referring now to FIG. 7, a container that closes to develop the wet substantially wicking substrate is illustrated according to one embodiment of the present invention. FIG. 7A illustrates a container 700 having top tray 703 and bottom tray 704. Top tray 703 and bottom tray 704 are connected with connecting hinge 707 that may be releasable. Top tray 703 and bottom tray 704 comprise an interior face and an exterior face (not shown). About one edge of the interior face of the top tray 703, the bottom tray 704 or both is a substantially wicking substrate fastener holder 701 and a solvent dispenser 702 that acts to secure a substantially wicking substrate against a solvent dispenser. Alternatively, within a bottom tray there is a compartment (for example a trough, not shown) for loading and holding solvent when bottom tray is in a horizontal position. Solvent is dispersed onto a substantially wicking substrate when the container is repositioned into a vertical position as compared to the horizontal loading position. The fastener 701 may be a protrusion on the surface of the top tray such that when the top tray is closed onto the bottom tray, the protrusion fits snugly against the solvent dispenser on the bottom tray and holds the substantially wicking substrate in place. Alternatively, fastener 701 could be a rod about which the substantially wicking substrate is positioned. In yet another alternative, a fastener 701 could be itself a solvent dispenser in the form of a sponge that is located on interior face of a top tray 703. When a substantially wicking substrate is positioned inside the container and the container is closed, the two sponges sandwich the substantially wicking substrate between them when top tray 703 is positioned over bottom tray 704 to close container 700 via the clasp 706. The substantially wicking substrate is held between the two sponges by friction. The sponge may act as the applicator for the solvent which can be applied to the sponge when container 700 is open. Alternatively solvent may be applied to the sponge through a port connecting the inside of container 700 with the outside of container 700. Once the substantially wicking substrate is positioned within container 700 with the ink applied at the defined region, the solvent from the sponges will cause the dye in the ink to navigate through the substantially wicking substrate by capillary action and/or gravity to pass outside the defined region. In general a substantially wicking substrate can be positioned within the container by a suspending means such as a clamp, adhesive, or wedge, but not limited thereto.

Referring now to FIG. 7B, projections 705 are positioned about the interior face of top tray 703, and/or bottom tray 704. Projections 705 act to keep the substantially wicking substrate from contacting that portion of the interior face of the top tray or the bottom tray that supports projections 705.

The substantially wicking substrate described above has a substantially smaller Z dimension (sometimes orders of magnitude smaller) in comparison to the X or Y dimension. However, if the Z dimension of a substantially wicking substrate is more similar in magnitude to the dimensions of X and Y, solvent migration through the defined region will result in three dimensional coloring of the substrate as opposed to a substantially wicking substrate having only an X and Y dimension of ink separation which results in a two dimensional coloring of the substrate.

Changing a solvent system—or—changing the substantially wicking substrate source often produces remarkably different patterns of color during the coloring process. For example, changing from deionized water to tap water (1000 ppm dissolved salts) or to higher concentrations of salt can cause significant effects on the color separations and coloration of the wicking substrate. Using vinegar, sugar water, or soapy water as solvent can produce remarkable changes and differences in color separations. The wet substantially wicking substrate with developed color pattern can be hung up (e.g. on a "clothes line") or placed onto the protective table covering or other non-porous surface to dry. Alternatively the wet paper can be further processed in a second direction causing a two (2) dimensional separation to create color movement in two different directions. When the paper is dry, this "product" can be used in several ways.

The dry colored substrate "product" can be cut "free form" by scissors or knife or torn or otherwise shaped into a shape or design of the maker's choice (many suggestions below).

An appropriate mask, pattern or overlay can be laid on top of the colored or partially colored zones on the dried product. A pencil can be used to lightly outline the shape of the mask. This outline marks the desired region to be cut out. Then the scissors can be used to cut out the outlined shape from the product. The cutout can be glued onto an appropriate place on a blank card stock or other support.

A greeting card can be formed from artful design created from the colored substrate. On the inside of the card, a message can be added (e.g. Happy Birthday, Happy Valentine's Day, Happy Mother's Day, Congratulations, etc). Perhaps leftover colored regions are used to cut out small shapes to glue to and accent the message page. Examples of shapes to use include:
- houses, birds, buildings, chimneys, fireplaces, mountains, rocks, bridges
- trees, flowers, bushes, plants, leaves, seeds, nuts
- boats, sailboats, canoes, kayaks, ships, skidoos,
- skis, hockey sticks, balls, soccer balls, baseballs, baseball mitts, basketballs, tennis rackets, golf clubs, golf bags, baseball bats, ball caps, game paraphernalia
- oars, paddles, sails, buoys, life vests, lighthouses, tepees, tents, slides
- tires, telephone poles, outboard engines, frisbees
- horses, cows, dogs, cats, goats, sheep, snakes, alligators,
- butterflies, bees, wasps, spiders, insects
- cartoon and movie characters, puppets
- skeletons, heads, hands, arms, legs, bones faces
- wild animals, tigers, lions, giraffes, zebras, elephants
- telephones, televisions, computers, cars, motorcycles, bicycles
- rugs, blankets, towels, washcloths, flags, pennants, drapes
- tables, chairs, beds, furniture
- playing cards, hearts, diamonds, spades, clubs
- apples, oranges, bananas, grapes, watermelons, fruit
- fishing rods, fish, rivers, waterfalls, lakes, sunsets,
- sun, moon, stars, sky, clouds, rain
- knives, forks, spoons, plates, cups, soda cans, bottles
- angels, devils, spears, tridents, crosses, stars of David, religious symbols
- swimsuits, bikinis, gloves, mittens, socks, shoes, pants, shirts, items of clothing
- windows, doors, shingles,
- Christmas items, Christmas trees, wreathes, candles, ornaments,
- baskets, boxes, jars,
- instruments, violins, flutes, guitars, pianos
- flower pots, vases Another embodiment of the present invention comprises an artistic method and kit for creating an art form.

The present invention has been described in terms of preferred embodiments, however, it will be appreciated that various modifications and improvements may be made to the described embodiments without departing from the scope of the invention.

For example, the system and method is suitable for producing earrings, broaches, and pins. The kit may contain a frame, glass window, and backing for producing a framed artwork for suspending on a wall. The kit may contain wire loops with attached plates for cut-out designs to be affixed for producing earrings for pierced ears. The kit may contain spring back clips for cutout designs to be affixed for producing earrings for unpierced ears. The kit may contain pin-stock or broach pin stock for affixing cutout designs for creating jewelry pins or broaches. The finished jewelry can be spray painted with clear lacquer or coated with nail polish to produce a shiny or glossy effect. An art work like an Alexander Calder mobile can be created for suspending from the ceiling or lamp. The kit can optionally contain an ink with a fragrance to provide a scent to the colored final product. Alternatively, the kit can contain a bottle of scented solution, like perfume, to apply to the final colored product.

Figure 8:
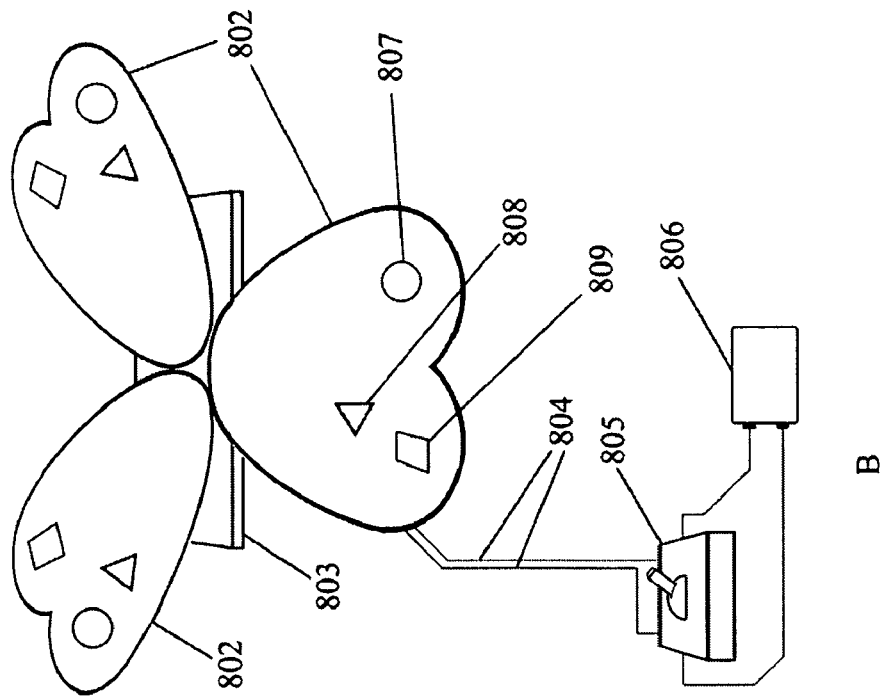
FIG. 8 illustrates an example of illuminated colored substantially wicking substrate affixed to a support.
Figure 8:
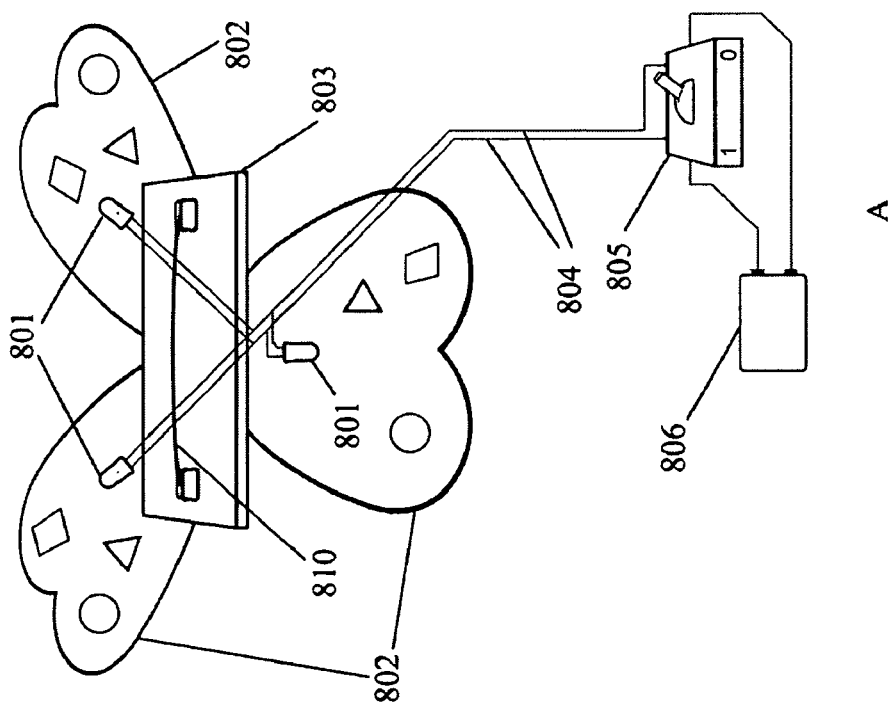

Referring to FIG. 8, and specifically FIG. 8B, substantially wicking substrates 802, colored with inks 807, 808 and 809, are suspended by support 803. Substantially wicking substrates 802 are connected to a controller 805 via connector 804. Controller 805 is connected to power source 806. When controller 805 is turned to the on position, substantially wicking substrates 802 are illuminated and can glow in the dark. Substantially wicking substrates 802 can be affixed to a number of assemblies, such as a backing for a pin assembly 810 (see FIG. 8A). FIG. 8A is the bottom view of a pin displaying a colored substantially wicking substrate having illumination lights 801.

Figure 9:
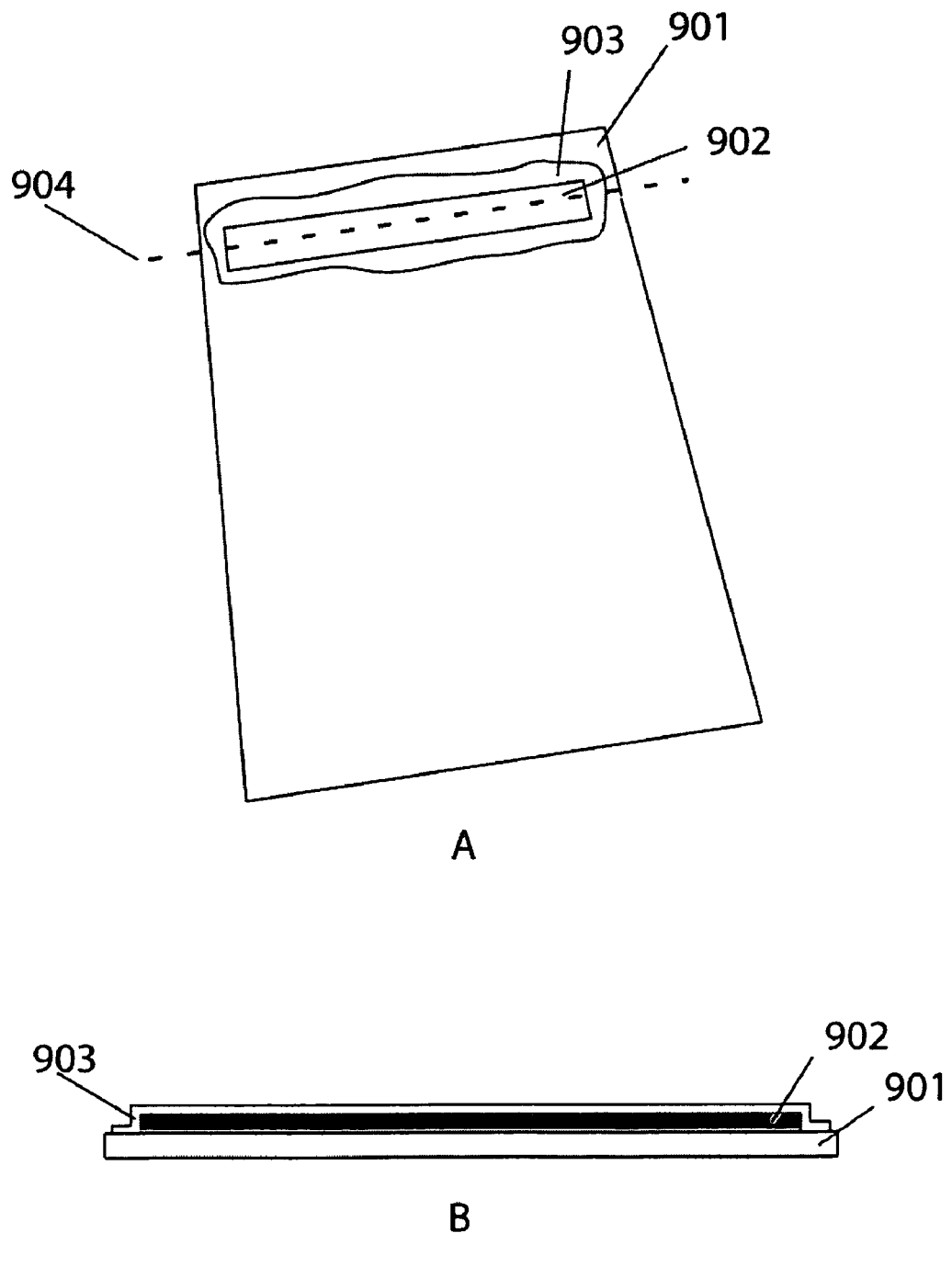
FIG. 9A illustrates an ink cartridge affixed to a substantially wicking substrate.
FIG. 9B illustrates a cross-section of a wicking substrate covered by a covering.

Referring now to FIG. 9, substantially wicking substrate 901 is depicted to which ink cartridge 902 is affixed to define ink application reference region 902 on the surface of wicking substrate 901 by means of covering 903. FIG. 9B depicts cross-section 904 of wicking substrate 901 covered by covering 903 as indicated by the dashed line in FIG. 9A. Coating 903 can be of any composition to affix ink cartridge 902 on the surface of wicking substrate 901 to define ink application reference region 902. In a preferred embodiment, coating 903 is insoluble in the solvent of the present invention and insoluble in the dyes and ink of the present invention, for example the coating may be a UV-cured material such as that made by Pierce & Stevens, Inc. of Carol Stream, Ill. 60188. Alternatively coating 903 can be cellophane adhesive tape or any other tape. Alternatively, coating 903 can be acrylic paint or any of a considerable number of other water-insoluble paints, varnishes, coatings. Using coating 903 with the properties of being insoluble in the solvent of the present invention and insoluble in the dyes and ink of the present invention affords some advantages. Affixing ink cartridge 902 in place with coating 903 can hide ink cartridge 902 from view and can prevent the ink from transferring to a table top or other surface (not shown) if substantially wicking substrate 901 with coating 903 side down were accidently placed onto a wet surface. In an alternative construction, ink cartridge 902 can itself be within the fibers or body of wicking substrate 901. In this configuration, ink cartridge 902 forms an actual portion and region of wicking substrate 901 to define ink application reference region 902 on the surface of wicking substrate 901. Such an ink cartridge 902 within the fibers or body of wicking substrate 901 can be covered with coating 903, but does not have to be covered by coating 903.

Figure 10:
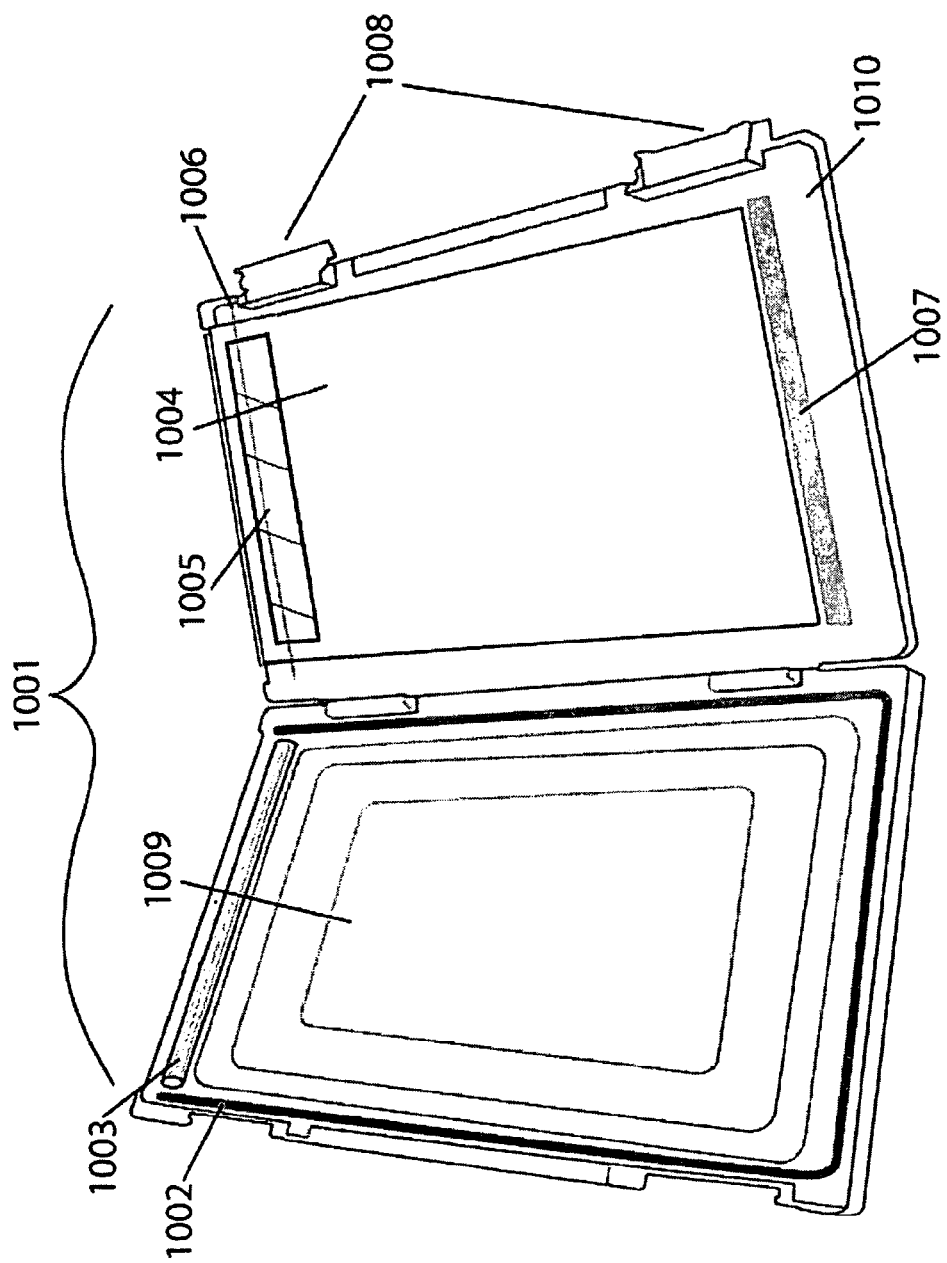
FIG. 10 illustrates a substantially wicking substrate positioned within a container.

Referring now to FIG. 10, substantially wicking substrate 1004 is shown as positioned within container 1001. Also depicted in FIG. 10 is gasket 1002, a rubber, silicone, or other suitable flexible, deformable material which makes a water-seal or solvent-seal on three sides of container 1001 when top tray 1009 of container 1001 is closed onto bottom tray 1010 of container 1001. The dimensions and location of gasket 1002 are designed to keep the solvent inside and to fit snuggly within closed container 1001 during solvent-induced coloration of wicking substrate 1004. The control of solvent is further enhanced by excess-solvent entrapper 1007. Entrapper 1007 is preferably constructed from something as simple as a sponge permanently affixed to one side, for example, bottom tray 1010 of container 1001; other materials for entrapper 1007 besides sponge are possible. The shape, size and location of entrapper 1007 are designed to fit snuggly within container 1001 when top tray 1009 is closed onto bottom tray 1010 with clasps 1008 engaged. Clasps 1008 may have snap-closer, snap-down buckle features to temporarily hold top tray 1009 engaged with bottom tray 1010 while container 1001 is being stored, transported, or being used for solvent-induced coloration of the wicking substrate 1004. Also illustrated in FIG. 10 is ink cartridge 1005. The location of ink cartridge 1005 defines the region of reference, the origin, for the dyes to be applied and subsequently separated in the initial steps of the invention. Ink cartridge 1005 preferably comprises porous material such as chromatography paper, Fisher Scientific 05-714-1, or indeed almost any porous substance, for example, such as those currently in use for ink-pen cartridge construction. Cartridge 1005 can be physically attached to wicking substrate 1004, can be a portion of and within wicking substrate 1004, or can be a separate entity; that is, ink cartridge 1005 does not have to be physically attached to or affixed to wicking substrate 1004. Ink cartridge 1005 can simply be chosen by the user from a collection of ink-impregnated sheets or forms 1005 or cut from one or more ink impregnated sheets to be placed onto one or more sheets of wicking substrate 1004 and held in place by closing top tray 1009 onto bottom tray 1010. On closing container 1001, line 1006 represents the approximate touching point of holder 1003 onto ink cartridge 1005 and wicking substrate 1004 when top tray 1009 is closed onto bottom tray 1010 and held by engaging the clasps or buckles 1008. It should be appreciated that the user may choose several differently colored ink cartridges or ink cartridges with several colors in a single coloration event with one or more sheets of wicking substrate. It also should be understood that the shape of ink cartridge 1005 need not be rectangular as shown for the purposes and function of providing ink at the defined region of this invention. Nor must ink cartridge 1005 be flat as depicted. The third dimension of ink cartridge 1005 does not have to be uniform in thickness and can have a rounded or other shape or unevenness to the third dimension.

According to another embodiment, illuminated colored substantially wicking substrate can be made from substantially wicking substrate colored with fluorescent and/or phosphorescent dyes. Shapes like butterflies or hearts can be cut out from colored substantially wicking substrate paper dyed with fluorescent inks. These shapes can be affixed to pin back assemblies modified to contain ultraviolet light emitting diodes connected appropriately to an electric circuit. The illuminated colored substantially wicking substrate will "glow in the dark."

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for producing an artistic article by coloring and shaping a substantially wicking substrate of dimensions X, Y, and Z with the XY plane representing the major plane, and affixing the colored shape onto a support comprising:

applying to a substantially wicking substrate an ink mixture comprising a first dye comprising a first dye molecule and a second dye comprising a second dye molecule to define a region of reference, the first dye molecule and the second dye molecule having different chemical structures that cause the first dye molecule and the second dye molecule to move at different rates within the substantially wicking substrate as a result of a first solvent;

applying the first solvent to the substantially wicking substrate to disperse the first and second dyes within an ink solution and to move the dyes;

moving by the first solvent the dissolved first dye and the dissolved second dye about the XY dimensions of the substantially wicking substrate in a defined direction to exploit the differences in partitioning behavior of the dyes as they chemically interact with first solvent and the substantially wicking substrate to carry the two dyes for different distances outside of the defined region of reference in the XY dimensions to color an area of the substantially wicking substrate;

coloring an area outside of the defined region of reference in the XY dimensions of the substantially wicking substrate by allowing the first solvent to move through a portion of the first dye for a first distance from the region of reference and the second dye a second distance from the region of reference wherein the first distance moved is sufficiently different from the second distance in the XY dimensions to recognize a separation between the first dye and the second dye;

selecting a user defined portion of the colored wicking substrate for further processing;

removing the user defined portion from the colored wicking substrate to use for shaping;

shaping into one or more shaped forms the portion of the colored wicking substrate removed;

assembling one or more colored shaped forms and a support into a user-defined aggregate; and affixing the aggregate onto the support to produce an artistic product for display.

2. The method of claim 1 further comprising combining the colored substantially wicking substrate thus produced with a second colored substantially wicking substrate or other form in the aggregate prior to affixing.

3. The method of claim 1 wherein the ink mixture, solvent, or both ink mixture and solvent further comprise a fragrance or the scent such that the fragrance or scent moves within the substantially wicking substrate as a result of first solvent; thus producing by first solvent migration a fragrant or scented substantially wicking substrate during the coloration aspect and a scented final product.

4. The method of claim 1 wherein the step of shaping includes removing the defined region of reference to where the ink is applied.

5. The method of claim 1 further comprising applying a second solvent to the substantially wicking substrate having the ink applied thereon.

6. The method of claim 5 further comprising permitting the second solvent to proceed through the defined region of reference in a different direction or same direction from the direction of the first solvent.

7. The method of claim 5 wherein the second solvent is the same or different from the first solvent.

8. The method of claim 1 wherein the support is selected from wood, plastic, paper, metal, glass, ceramic, bone, fish scale, animal hide, string, ribbon, plant materials, animate and inanimate objects like people, dogs, bicycles, notebooks, illumination means, or a combination thereof.

9. The method of claim 1 wherein the solvent is selected from water, alcohols, aliphatic hydrocarbons, amides, amines, aromatic hydrocarbons, halogenated hydrocarbons, ethers, esters, acetates, ketones, citrus oils, glycols, glycol ethers, acids, bases, aldehydes, soaps, detergents, surfactants, dimethyl sulfoxide or any combination thereof.

10. The method of claim 1 wherein the step of shaping comprises folding, bending, tearing, cutting, dividing, separating, scraping, sanding, shredding, piercing, slicing, twisting, curling, hammering, burning, melting, or placing holes into the shape, or any combination thereof from the colored wicking substrate.

11. The method of claim 1 wherein the step of affixing comprises one or more selected from stapling, folding, gluing, pasting, adhering, cementing, taping, pinning, hooking, crimping, trapping, pressing, tying, inserting into a slit or restraint, or framing or any combination thereof.

12. The method of claim 1 wherein either one or both of the steps of applying are via an applicator held in relation to the substantially wicking substrate by an animal or object shaped applicator holder.

13. The method of claim 1 wherein the defined direction is in the XY plane of the substantially wicking substrate.

14. The method of claim 1 further comprising a secondary treatment selected from the group consisting of artificial irradiation with wavelengths between about 200 nm-1500 nm, heating, chemically treating, or a combination thereof for visualization or enhancement of the visible, or initially invisible, solvent-separated first and second dyes in the assembled artistic product.

15. The method of claim 1 wherein the step of assembling is selected from positioning, rotating, reorienting, reorganizing, reassembling, turning over, juxtaposing, or any combination thereof before affixing.

16. A method for producing an artistic article by coloring and shaping a substantially wicking substrate of dimensions X, Y, and Z with the XY plane representing the major plane, and affixing the colored shape onto a support comprising:
   applying to a substantially wicking substrate an ink mixture comprising a first dye comprising a first dye molecule and a second dye comprising a second dye molecule to define a region of reference, the first dye molecule and the second dye molecule having different chemical structures that cause the first dye molecule and the second dye molecule to move differently within the substantially wicking substrate as a result of a first solvent;
   applying the first solvent to the substantially wicking substrate to move the first dye and the second dye about the XY dimensions of the substantially wicking substrate;
   differentially moving by the first solvent the first dye and the second dye within the substantially wicking substrate in a defined direction to carry the two dyes outside of the defined region of reference in the XY dimensions to color an area of the substantially wicking substrate;
   coloring an area outside of the defined region of reference in the XY dimensions of the substantially wicking substrate by allowing the first solvent to move through a portion of the first dye for a first distance from the region of reference and the second dye a second distance from the region of reference wherein the first distance moved is sufficiently different from the second distance in the XY dimensions to recognize a separation between the first dye and the second dye;
   selecting a user defined portion of the colored wicking substrate for further processing;
   removing the user defined portion from the colored wicking substrate to use for shaping;
   shaping into one or more shaped forms the portion of the colored wicking substrate removed;
   assembling one or more colored shaped forms and a support into a user-defined aggregate; and
   affixing the aggregate onto the support to produce an artistic product for display
   wherein the step of applying the ink mixture is made by means of an ink cartridge constructed of a porous material, said ink cartridge containing first and second dye molecules held within the porous material, said ink cartridge positioned and held in place on, near or in contact with the wicking substrate.

17. The method of claim 16 further comprising positioning a waterproofing layer over the ink cartridge to prevent the ink from the ink cartridge from transferring to a wet surface when the substantially wicking substrate is placed on a wet surface with the waterproof layer between the ink cartridge and the wet surface.

18. The method of claim 16 wherein the cartridge is sandwiched between a second substantially wicking substrate and the substantially wicking substrate.

19. The method of claim 16 wherein the substantially wicking substrate is folded to create the second substantially wicking substrate.

20. The method of claim 16 wherein the step of shaping includes removing the defined region of reference and the ink cartridge.

21. A method for producing an artistic article with a substantially wicking substrate of dimensions X, Y, and Z with the XY plane representing the major plane comprising:
   applying to a substantially wicking substrate an ink via an ink cartridge on the substantially wicking substrate, wherein the ink comprises a first dye and a second dye to create a defined region of reference in the XY plane of the wicking substrate;
   applying a first solvent to the substantially wicking substrate to move the first dye and the second dye about the XY dimensions of the substantially wicking substrate; and moving the first dye and the second dye in a defined direction and outside of the defined region in the XY dimensions on the substantially wicking substrate by means of the solvent;

coloring an area outside of the defined region in the XY dimensions of the substantially wicking substrate by allowing the first solvent to move through a portion of the first dye for a first distance from the defined region and the second dye a second distance from the defined region wherein the first distance is sufficiently different from the second distance in the XY dimensions to recognize a separation between the first dye and the second dye;

selecting a portion of the colored substrate for further processing;

shaping a portion of the colored wicking substrate into one or more shaped forms;

assembling one or more shaped colored forms and a support into an aggregate;

affixing the aggregate onto a support for display; and positioning a waterproof layer over the ink cartridge to prevent the ink in the ink cartridge from transferring to a wet surface when the substantially wicking substrate is placed on a wet surface with the waterproof layer between the ink cartridge and the wet surface.

22. The method of claim 21 further comprising producing a fragrance or a scent on the substantially wicking substrate during the coloration aspect induced by the first solvent, wherein the ink mixture, solvent, or both ink mixture and solvent comprise the fragrance or the scent.

23. A method for producing an artistic article with a substantially wicking substrate of dimensions X, Y, and Z with the XY plane representing the major plane comprising:

applying to a substantially wicking substrate an ink via an ink cartridge on the substantially wicking substrate, wherein the ink comprises a first dye and a second dye to create a defined region of reference in the XY plane of the wicking substrate;

applying a first solvent to the substantially wicking substrate to move the first dye and the second dye about the XY dimensions of the substantially wicking substrate;

moving the first dye and the second dye in a defined direction and outside of the defined region in the XY dimensions on the substantially wicking substrate by means of the solvent;

coloring an area outside of the defined region in the XY dimensions of the substantially wicking substrate by allowing the first solvent to move through a portion of the first dye for a first distance from the defined region and the second dye a second distance from the defined region wherein the first distance is sufficiently different from the second distance in the XY dimensions to recognize a separation between the first dye and the second dye;

selecting a portion of the colored substrate for further processing;

shaping a portion of the colored wicking substrate into one or more shaped forms;

assembling one or more shaped colored forms and a support into an aggregate; and affixing the aggregate onto a support for display;

wherein the ink cartridge is sandwiched between a second substantially wicking substrate and the substantially wicking substrate.

24. The method of claim 23 wherein the substantially wicking substrate is folded to create the second substantially wicking substrate.

25. A method for producing an artistic article by coloring and shaping a substantially wicking substrate of dimensions X, Y, and Z with the XY plane representing the major plane, and affixing the colored shape onto a support comprising:

applying to a substantially wicking substrate an ink mixture comprising a first dye comprising a first dye molecule and a second dye comprising a second dye molecule to define a region of reference, the first dye molecule and the second dye molecule having different chemical structures that cause the first dye molecule and the second dye molecule to move differently within the substantially wicking substrate as a result of a first solvent;

applying the first solvent to the substantially wicking substrate to move the first dye and the second dye about the XY dimensions of the substantially wicking substrate;

differentially moving by the first solvent the first dye and the second dye within the substantially wicking substrate in a defined direction to carry the two dyes outside of the defined region of reference in the XY dimensions to color an area of the substantially wicking substrate;

coloring an area outside of the defined region of reference in the XY dimensions of the substantially wicking substrate by allowing the first solvent to move through a portion of the first dye for a first distance from the region of reference and the second dye a second distance from the region of reference wherein the first distance moved is sufficiently different from the second distance in the XY dimensions to recognize a separation between the first dye and the second dye;

selecting a user defined portion of the colored wicking substrate for further processing;

removing the user defined portion from the colored wicking substrate to use for shaping;

shaping into one or more shaped forms the portion of the colored wicking substrate removed;

assembling one or more colored shaped forms and a support into a user-defined aggregate; and affixing the aggregate onto the support to produce an artistic product for display;

wherein the support for display includes an illumination means for enhanced visualization of the dye-separated, colored and assembled artistic product.

26. A method for producing an artistic article by coloring and shaping a substantially wicking substrate of dimensions X, Y, and Z with the XY plane representing the major plane, and affixing the colored shape onto a support comprising:

applying to a substantially wicking substrate an ink mixture comprising a first dye comprising a first dye molecule and a second dye comprising a second dye molecule to define a region of reference, the first dye molecule and the second dye molecule having different chemical structures that cause the first dye molecule and the second dye molecule to move differently within the substantially wicking substrate as a result of a first solvent;

applying the first solvent to the substantially wicking substrate to move the first dye and the second dye about the XY dimensions of the substantially wicking substrate;

differentially moving by the first solvent the first dye and the second dye within the substantially wicking substrate in a defined direction to carry the two dyes outside of the defined region of reference in the XY dimensions to color an area of the substantially wicking substrate;

coloring an area outside of the defined region of reference in the XY dimensions of the substantially wicking substrate by allowing the first solvent to move through a portion of the first dye for a first distance from the region of reference and the second dye a second distance from the region of reference wherein the first distance moved is sufficiently different from the second distance in the XY dimensions to recognize a separation between the first dye and the second dye;

selecting a user defined portion of the colored wicking substrate for further processing;

removing the user defined portion from the colored wicking substrate to use for shaping;

shaping into one or more shaped forms the portion of the colored wicking substrate removed;

assembling one or more colored shaped forms and a support into a user-defined aggregate; and affixing the aggregate onto the support to produce an artistic product for display;

wherein one or more dyes in the ink mixture are initially invisible to the naked eye requiring a secondary treatment for visualization.

27. The method of claim 26 further comprising a secondary treatment selected from the group consisting of artificial irradiation with wavelengths between about 200 nm-1500 nm, heating, chemically treating, or a combination thereof for visualization or enhancement of the visible, or initially invisible, solvent-separated first and second dyes in the assembled artistic product.

28. A method for producing an artistic article by coloring and shaping a substantially wicking substrate and affixing the colored shape onto a support comprising:

applying to a substantially wicking substrate an ink by means of an ink cartridge; said ink comprising dye or pigment containing dye molecules, said ink cartridge constructed of porous material to contain the ink and positioned and held in place on, near, or in contact with the wicking substrate so as to define a region of reference and to deliver the ink during a first solvent application;

applying a first solvent to disperse the dye molecules from the ink cartridge within the first solvent and to carry at least a portion of the dye molecules from the ink cartridge to the substantially wicking substrate to color the wicking substrate;

coloring an area outside of the defined region of reference by causing the first solvent to move the dye molecules about the substantially wicking substrate;

selecting a user defined portion of the colored wicking substrate for further processing;

removing the user defined portion from the colored wicking substrate to use for shaping;

shaping into one or more shaped forms the portion of the colored wicking substrate removed;

assembling one or more colored shaped forms and a support into a user-defined aggregate; and affixing the aggregate onto the support to produce an artistic product for display.

* * * * *